United States Patent [19]
Halpert et al.

[11] Patent Number: 5,664,180
[45] Date of Patent: Sep. 2, 1997

[54] DESIGN TOOL FOR COMPLEX OBJECTS WHICH LINKS OBJECT STRUCTURES OF A DESIGN OBJECT IN MULTIPLE DESIGN DOMAINS

[75] Inventors: David E. Halpert, Brownsville, Vt.; Mario Ambrosi, Meriden, N.H.; Paul Ames; Vladimir Plsek, both of Lebanon, N.H.; Mark Roth, Whitefish Bay; James Sheldon, Mequon, both of Wis.

[73] Assignee: Framework Technologies Corporation, Lebanon, N.H.

[21] Appl. No.: 408,611

[22] Filed: Mar. 20, 1995

[51] Int. Cl.⁶ .................................................. G06F 17/30
[52] U.S. Cl. ............................................ 395/613; 395/615
[58] Field of Search ................................. 395/600, 613, 395/615

[56] References Cited

U.S. PATENT DOCUMENTS

| | | | |
|---|---|---|---|
| 4,315,315 | 2/1982 | Kossiakoff | 364/300 |
| 4,901,221 | 2/1990 | Kodosky et al. | 364/200 |
| 5,021,976 | 6/1991 | Wexelblat et al. | 395/159 |
| 5,168,441 | 12/1992 | Onarheim et al. | 364/146 |
| 5,261,045 | 11/1993 | Sculley et al. | 395/161 |
| 5,278,946 | 1/1994 | Shimada et al. | 395/62 |
| 5,295,222 | 3/1994 | Wadhwa et al. | 395/700 |
| 5,408,470 | 4/1995 | Rothrock et al. | 370/62 |
| 5,446,885 | 8/1995 | Moore et al. | 395/600 |
| 5,499,369 | 3/1996 | Atkinson | 395/650 |
| 5,552,995 | 9/1996 | Sebastian | 364/468.03 |
| 5,553,224 | 9/1996 | Saund et al. | 395/155 |

OTHER PUBLICATIONS

Cornelio, A et al., "Using Active Database Techniques for Real Time Engineering Applications", Proceedings Ninth International Conference on Data Engineering, Vienna, Austria, pp. 100–107 (Apr. 19, 1993).

Chou, H. et al., "Versions and Change Notification in an Object–Oriented Database System", 25th ACM/IEEE Design Automation Conference, Anaheim Convention Center, US, pp. 275–281 (Jun. 12, 1988).

Tuijnman, F. et al., "Sharing Complex Objects in a Distributed Peer Environment", Proceedings The 13th International Conference on Distributed Computing Systems, Pittsburgh, Pennsylvania, pp. 186–196 (May 25, 1993).

Primary Examiner—Wayne Amsbury
Attorney, Agent, or Firm—Wolf, Greenfield & Sacks, P.C.

[57] ABSTRACT

A method and apparatus displays a plurality of representations of an environment. The method includes the steps of (a) providing an object structure having a first branch of object data structures that defines a first domain of the environment, a second branch of object data structures that defines a second domain of the environment, both a first object data structure of the first branch and a second object data structure of the second branching defining a particular article in the environment; (b) displaying a first graphical image defined by the first object data structure; (c) changing a feature of the first object data structure; (d) automatically notifying the second object data structure; and (e) displaying a second graphical image defined by the second object data structure, the second graphical image providing an indication of a feature change of the first object data structure.

41 Claims, 19 Drawing Sheets

DESIGN TOOL FOR COMPLEX OBJECTS WHICH LINKS OBJECT STRUCTURES OF A DESIGN OBJECT IN MULTIPLE DESIGN DOMAINS

FIELD OF THE INVENTION

This invention relates to an object-oriented data processing system, and more particularly to methods and apparatus for displaying representations of an environment and of various domains thereof in a computer system.

BACKGROUND OF THE INVENTION

In manufacturing, processing and other complex systems, it is desirable that the system functions be achieved while efficiently using resources to minimize costs. Design teams, which depending on the system may include one or more design team members having specialized areas of expertise, attempt to optimize such systems without using unreasonable amounts of time and effort. For example, a design team may include mechanical engineers that seek to develop floor plans that position components (or articles) of the system on a shop floor or in another appropriate environment to provide easy access and optimize use of available space; process engineers seeking to design processes that use raw materials efficiently and eliminate significant bottle necks; and electrical engineers that seek to develop electrical plans that ensure, among other things, that the articles in the environment have access to appropriate electrical inputs. Accordingly, each member of the design team attempts to develop designs that work well from the perspective of the particular member's area of specialization.

Design team members often use computerized tools to assist them when developing a complex system. For instance, a process engineer may use a process modeling tool to generate a computerized representation of the system environment. U.S. Pat. No. 5,168,441, issued on Dec. 1, 1992, to Onarheim et al. (the '441 patent) is such a tool and is incorporated herein by reference. The '441 patent allows a user to represent different stages of a process in an interactive window that shows a process flow from one stage of the process to another. In particular, the '441 patent provides a car wash example that represents different stages such as an entrance stage, a wash stage, a wax stage, and a dry stage of the car wash.

Although each member of the design team may develop a successful design when viewed within the design team member's area of specialization, or within an area or domain in which the design member is currently working, it is difficult to organize and coordinate the team members' designs in the various domains into a practical and workable system that can be implemented at a reasonable cost. Often, the task of combining the designs by organizing and coordinating the design information for each domain is so complex and unique that this task is performed manually, requiring large amounts of time and effort. Furthermore, inconsistencies or incompatibilities often arise between the designs of different design team members in the various domains, but may not be discovered until late in the development process when the design information in the various domains is to be combined. Sometimes such errors are completely missed in the design process and may only turn up when problems develop in the resulting systems. Unfortunately, such design incompatibilities, and even design errors and mistakes, are difficult to avoid, particularly in large and complex manufacturing or other system designs. One reason for this is that current design tools do not send messages between domains to flag or compensate for actions or changes in one domain which may affect other domains, or affect other portions of (or articles in) the same domain.

Accordingly, a need exists for a tool that organizes and coordinates design information from different members of a design team for different domains to overcome the drawbacks identified above. In particular, a tool that automatically organizes and coordinates design information representing multiple domains of a design environment will not only reduce the amount of time and expenses required to combine the information into a practical and implementable design, but also will reduce the chances of making design errors.

SUMMARY OF THE INVENTION

In accordance with the above, the present invention is generally directed to a method and apparatus for displaying a plurality of representations of an environment. A computer is provided having a memory, an output device and a processor coupled to the memory and the output device. The processor provides in the memory an object structure having a first branch of object data structures that defines a first domain of the environment, and a second branch of object data structures that defines a second domain of the environment, with both a first object data structure of the first branch and a second object data structure of the second branch defining a particular article in the environment. The processor further displays a first graphical image defined by the first object data structure on the output device, changes a feature of the first object data structure, generally in response to a user input, automatically notifies the second object data structure of a feature change, and displays a second graphical image defined by the second object data structure, the second graphical image providing an indication of the feature change of the first object data structure on the output device.

The foregoing and other objects, features and advantages of the present invention will be apparent from the following more detailed description of the invention.

DETAILED DESCRIPTION

The present invention will be more completely understood through the following detailed description which should be read in conjunction with the attached drawing in which similar reference numbers indicate similar structures. All references cited are hereby expressly incorporated by reference.

Figure 1:
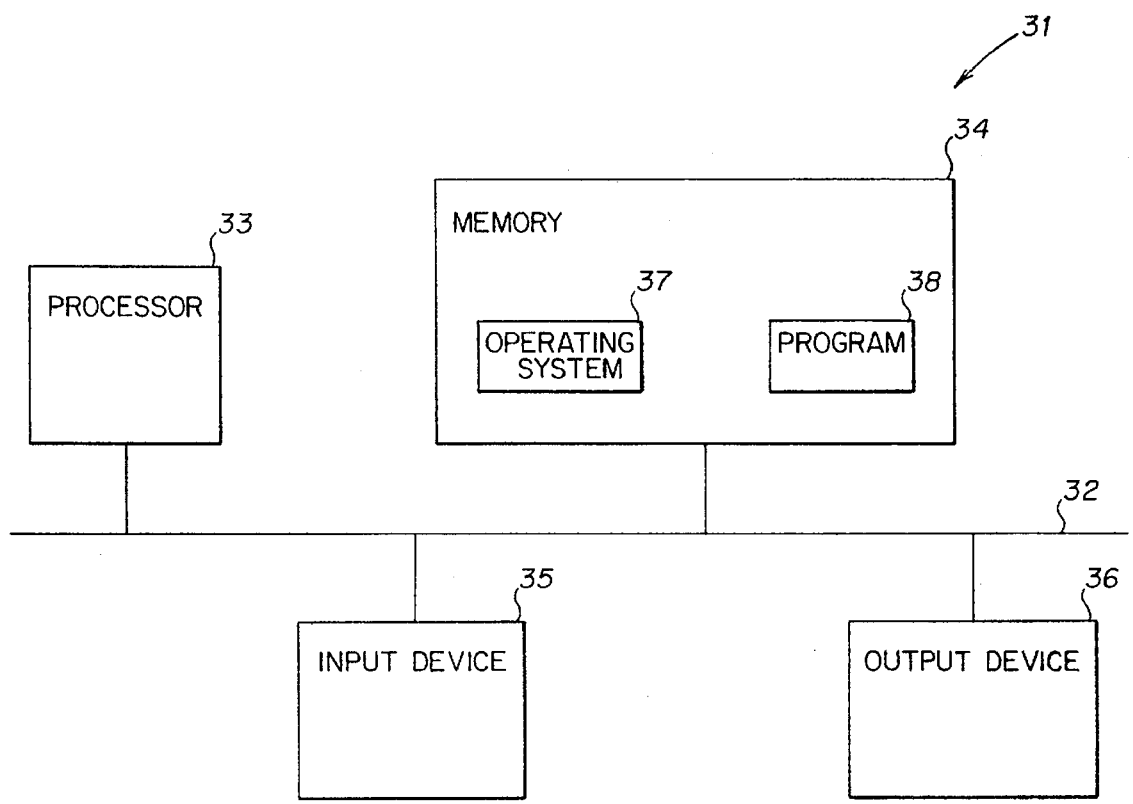
FIG. 1 is a block diagram of a computer system suitable for implementing the invention.

FIG. 1 is a block diagram of an exemplary computer 31 suitable for use in practicing the invention. The computer 31 includes a general system bus 32 that connects a processor 33 with a memory 34, an input device 35, and an output device 36. The memory 34 includes both primary memory which provides fast access time and is typically in the form of semiconductor memory, and secondary memory which provides slower access time, retains data if power to the computer 31 is lost, and is significantly less expensive per byte stored so as to be suitable for bulk storage. Magnetic disk or tape are frequently used for secondary memory. The computer 31 further includes an operating system 37 stored in the memory 36. The operating system 37 enables the processor 33 to execute programs and manage computer resources such as memory space.

The invention further includes a program 38 stored in the memory 34. The program 38 is a design tool that helps engineers design manufacturing systems. In particular, program 38 organizes and coordinates design information from many disciplines such as mechanical engineering, electrical engineering, structural engineering, etc. Program 38 includes an interface that enables each member of a design team to enter design information specific to the member's discipline and access design information from other design team members during the design process. Accordingly, the program organizes and coordinates the design information to verify that the design information is compatible so that both redesign time and the chance of making a costly design error are reduced.

To organize and coordinate the design information, program 38 provides each user with a the ability to (1) view a computerized representation of an environment, such as a manufacturing system, from different domains, (2) navigate through different views of the computerized representation, and (3) make changes to the computerized representation and automatically distribute the changes throughout the computerized representation so that the other members of the design team are apprised of the changes. The term "domain" refers to a view of the environment from a particular perspective such as the process perspective. The term "navigate" refers to a user controlling the program 38 so that the desired design information is displayed on the output device 36.

Figure 2:
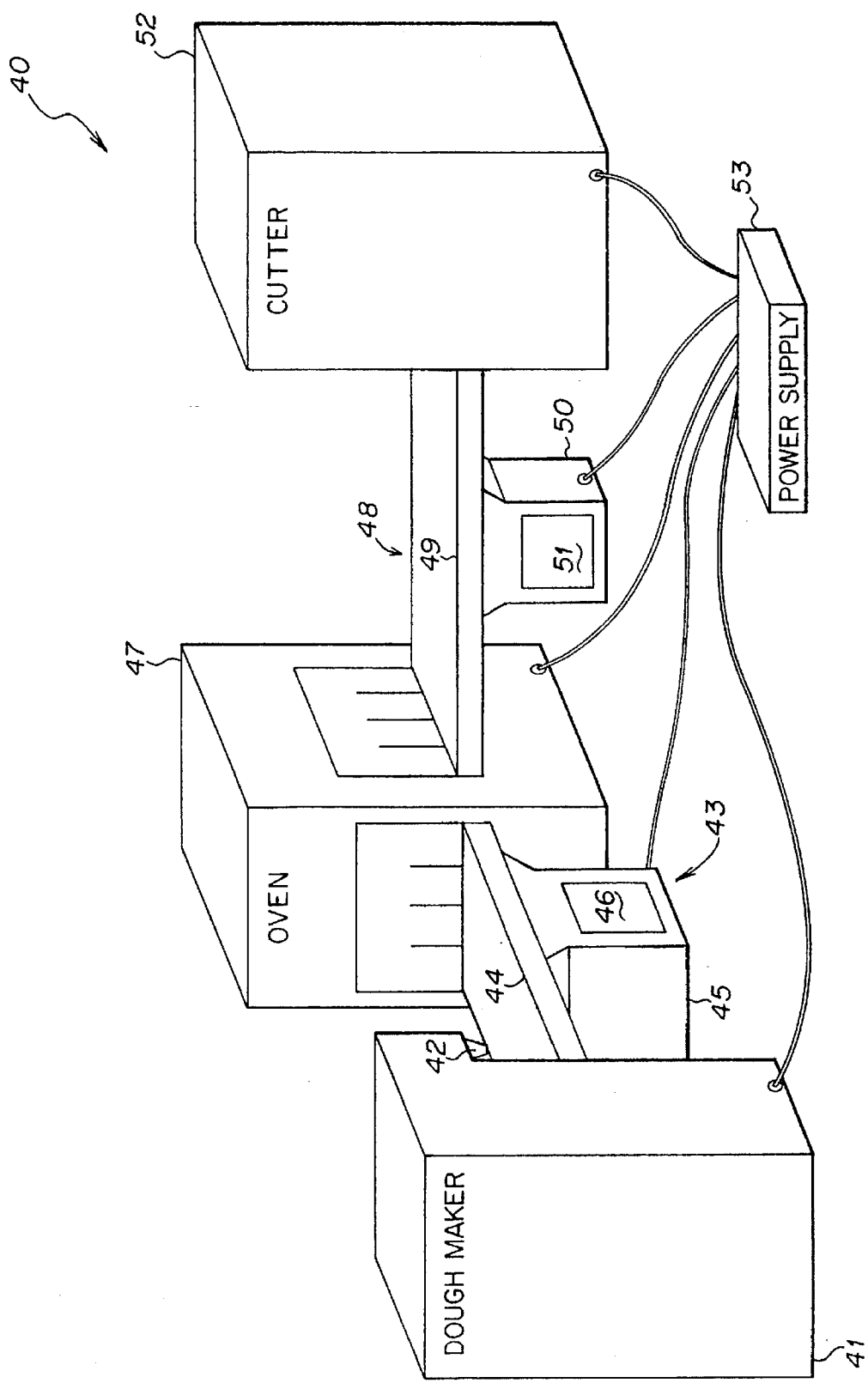
FIG. 2 is a diagram of a representative environment which may be utilized to illustrate the teachings of the invention.

FIG. 2 shows an illustrative bakery environment 10 which will be utilized in describing the invention. The bakery 10 may be either a new bakery that the design team plans to build or an existing bakery that the design team wishes to modify.

For purposes of the following discussion, it is assumed that each member of the design team has a specialized role, although the invention could also be used to aid a single designer or multiple designers each of whom is working in multiple disciplines. For example, the design team might include a plant engineer who controls the physical layout of the shop floor and is therefore primarily interested in the physical features of dough maker 41, conveyors 43 and 48, oven 47, and cutter 52, since each of these articles competes for floor space. A second member of the team might be a process engineer, who is interested in the bakery 40 from the process perspective, i.e., the process engineer wants to know the inputs and outputs of the process related articles, so that capacity may be maximized and bottlenecks may be reduced. Accordingly, the process engineer is primarily interested in the process features of dough maker 41, oven 47, and cutter 52, so that the bakery 40 can efficiently produce freshly cut bread. Another member of the team might be an electrical engineer who, being interested in the bakery 40 from the electrical perspective, is primarily concerned with the electrical features of the bakery 40 such as whether each article of the bakery has access to the proper voltage, current, power, etc.

Figure 3:
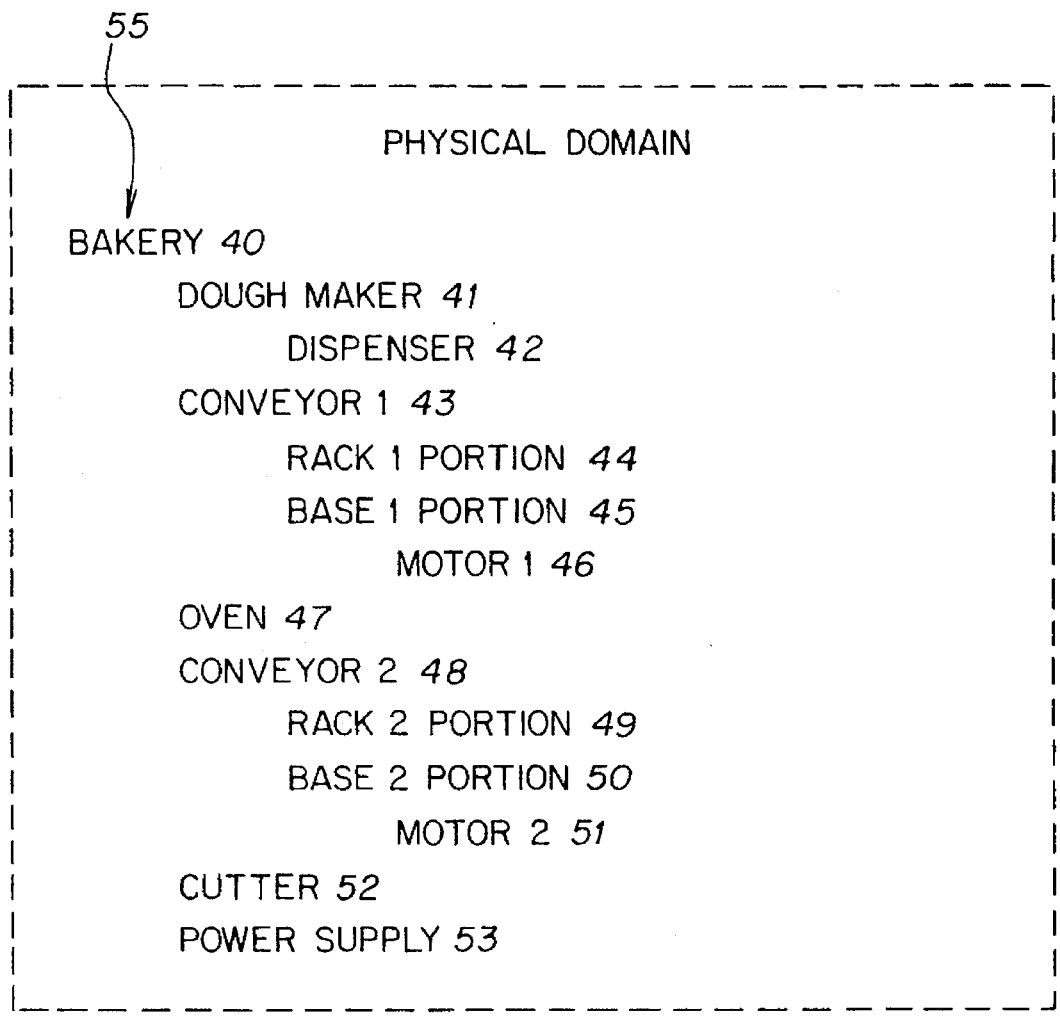
FIG. 3 is a hierarchical list of articles in the environment of FIG. 2 that a design team may wish to represent in a physical domain.

FIG. 3 is a hierarchically structured list 55 of the illustrative articles in the bakery 40 viewed from the physical perspective, i.e., in the physical domain. In particular, the physical domain is partitioned into three levels as shown by the indentations of the article names in the list. The dough maker 41, conveyors 43 and 48, oven 47, cutter 52, and power supply 53, are the articles of the bakery 40 in the first level since they consume the floor space. In a second level, the component articles of each first level article are listed. For instance, dough maker 41 includes a dispenser 42 and each conveyor 43, 48 includes a rack portion 44, 49 and a base portion 45, 50. Similarly, in a third level, each base portion 45, 50 contains a corresponding motor 46, 51. Any change in the size, shape, location or other physical characteristic of one of these articles may necessitate corresponding changes in physical characteristics for the same or other articles.

Figure 4:
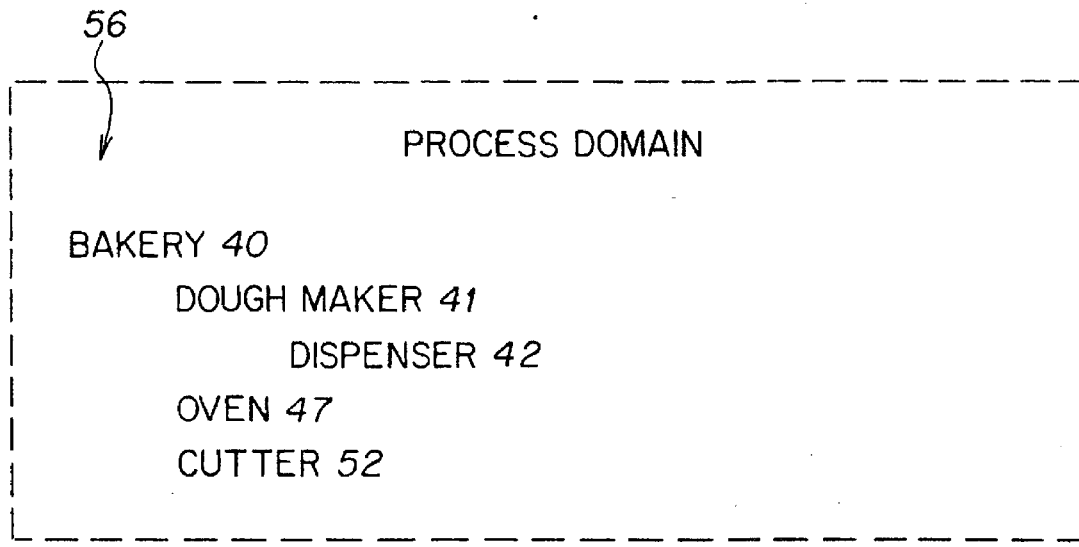
FIG. 4 is a hierarchical list of articles in the environment of FIG. 2 that the design team may wish to represent in a process domain.

FIG. 4 is a hierarchically structured list 56 of the illustrative articles of the bakery 40 viewed from the process perspective, i.e., in the process domain. In particular, the process engineer views dough maker 41, dispenser 42 of the dough maker (second level), oven 47, and cutter 52 as being the articles of the bakery that relate to the process of making freshly cut bread. The conveyors are not perceived as being significant to the process domain since they do not modify the intermediate products in the process and simply transfer the products to the next article in the process.

Figure 5:
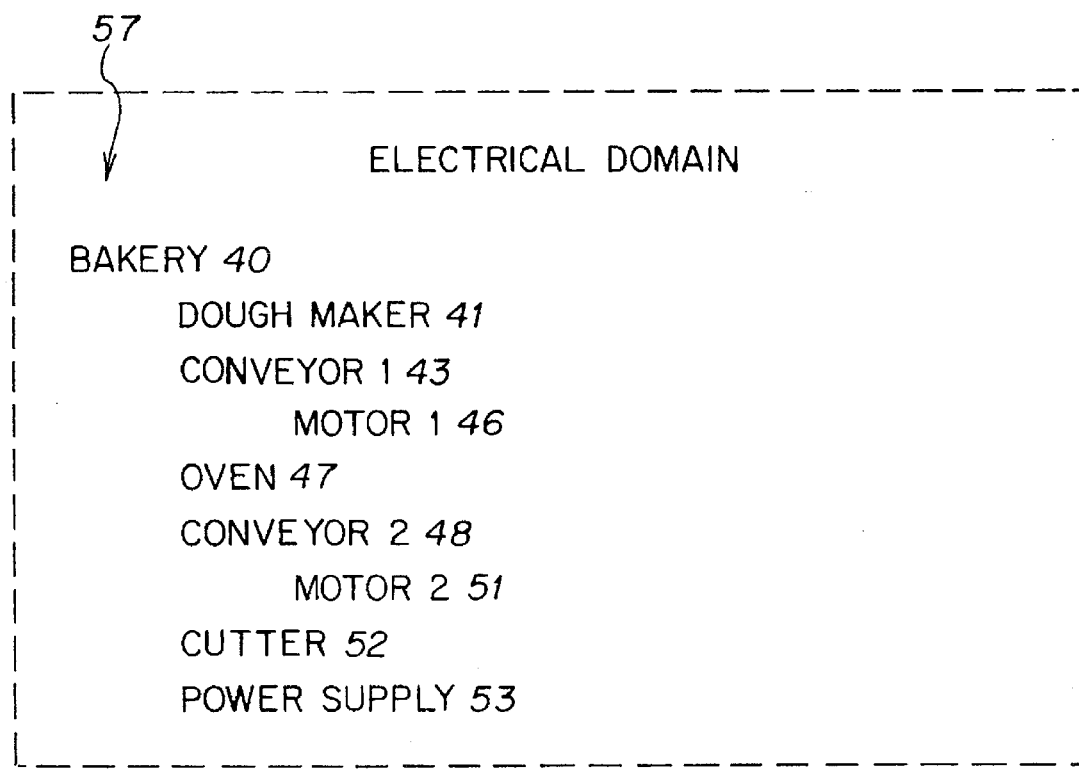
FIG. 5 is a hierarchical list of articles in the environment of FIG. 2 that the design team may wish to represent in an electrical domain.

FIG. 5 is a hierarchically structured list 57 of the illustrative articles of the bakery 40 viewed from the electrical perspective, i.e., in the electrical domain. In particular, the electrical engineer views dough maker 41, conveyors 43 and 48, oven 47, and cutter 52 as being articles of the bakery that consume electricity. The electrical domain also includes power supply 53 which provides power to each of the articles. More specifically, conveyors 43 and 48 include motors 46 and 51 (second level), respectively, which are the articles of the conveyors that actually consume power.

For preferred embodiments, program 38 is an object-oriented program that creates an object structure in response to user commands to represent the environment. The user commands are entered into the computer 31 through the input device 35. Additional information may be entered through the input device 31 or copied into memory from an external file (e.g. from a diskette inserted into a disk drive, i.e., secondary memory). When the additional information is entered through the input device 31, a dialogue box or graphical tool may be displayed on the output device 36 to assists the user. A description of each object of the object structure will now be provided.

Each object of the object structure is a data structure that is stored in the memory 34 of the computer 40. Each object includes a collection of variables that define the state of the object and a collection of methods that define the functionality of the object. The '441 patent provides a detailed description of the Smalltalk Programming Language, an object-oriented programming language that may be used to implement the invention. Other suitable languages include C++ and Ada.

Figure 6:
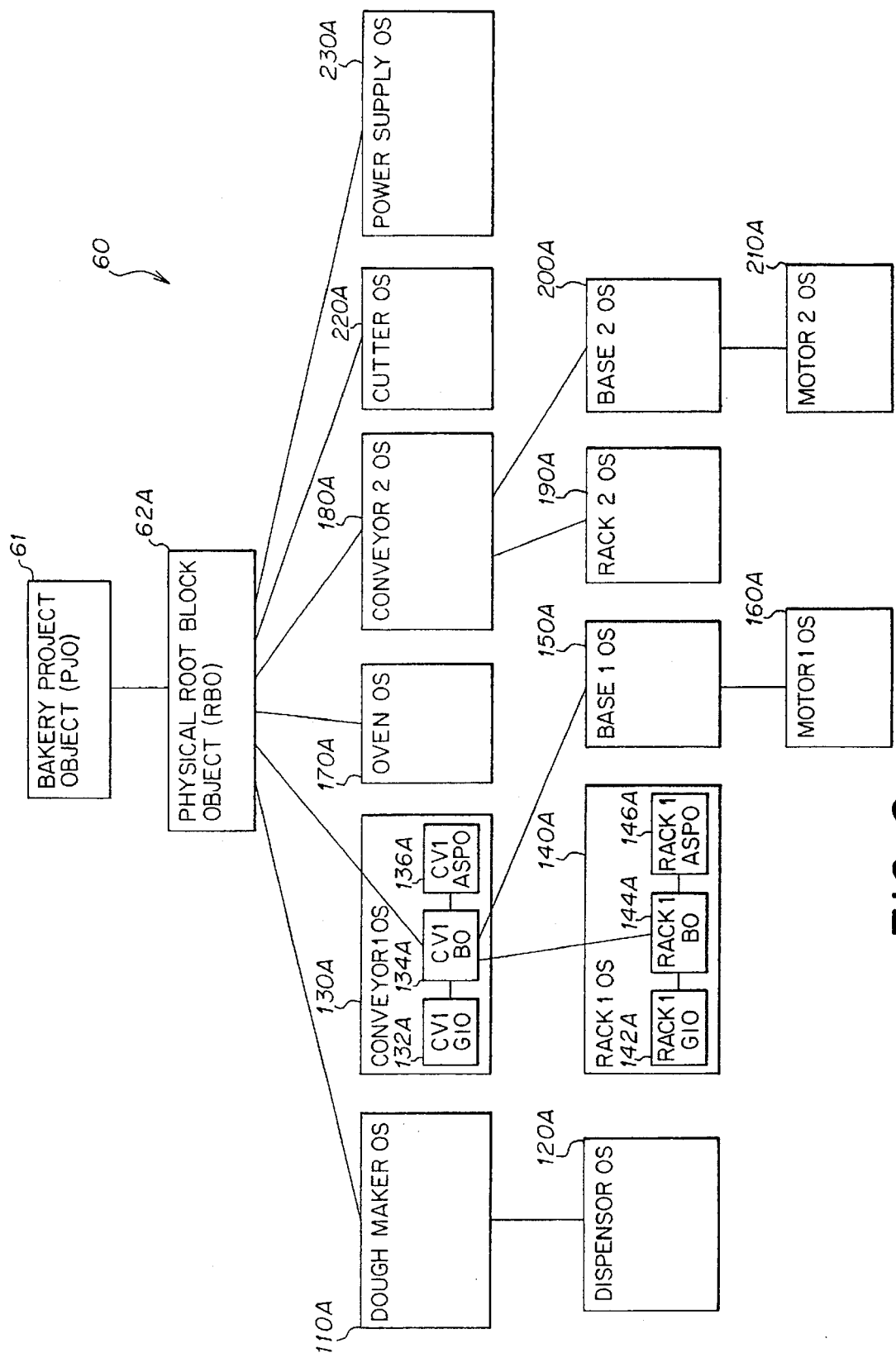
FIG. 6 is a block diagram of a portion of an object structure that represents the physical domain of the environment of FIG. 2 in accordance with the teachings of the invention.

One object data structure of the invention is a project object which identifies the environment that is represented by the object structure. For instance, FIG. 6 shows a portion of an object structure 60 that is the computerized representation of the bakery environment 40. Included in the object structure 60 is the bakery project object 61 which identifies the bakery environment 40.

Another object data structure of the invention is a root block object which identifies a particular domain of the environment that is represented by the object structure. FIG. 6 shows the physical root block object 62A which identifies the physical domain of the bakery environment 40 that is represented by the object structure 60. A link exists between the project object and each root block object of the object structure (only one is shown in FIG. 6), as depicted in the bakery example by the line shown between the bakery project object 61 and the physical root block object 62A. A link between two objects is implemented using a pair of pointers. Each object has a pointer (one of the pair) which stores the memory address location of the other object. Accordingly, the bakery project object 61 stores a pointer to the physical root block object 62A and the physical root block object 62A stores a pointer to the bakery project object 61.

Another object data structure of the invention is an object set which represents an article of the environment in a particular domain. Object sets for the physical, process and electrical domains have reference numerals ending in A, B and C, respectively. For example, FIG. 6 shows the object sets that represent the articles in the list 55 (see FIG. 3). Each object set is linked to at least one other object set and/or a root block object. For example, the conveyor1 object set 130A is linked to both the physical root block object 62A and to rack1 object set 140A and base object set 150A. The conveyor1 object set 130A considers the physical root block object 62A to be its parent. The conveyor1 object set 130A considers both the rack1 and base1 object sets 150A and 150A to be its children. The object set functionality provides a displayable image of the represented article and message sending features as discussed below.

Figure 7:
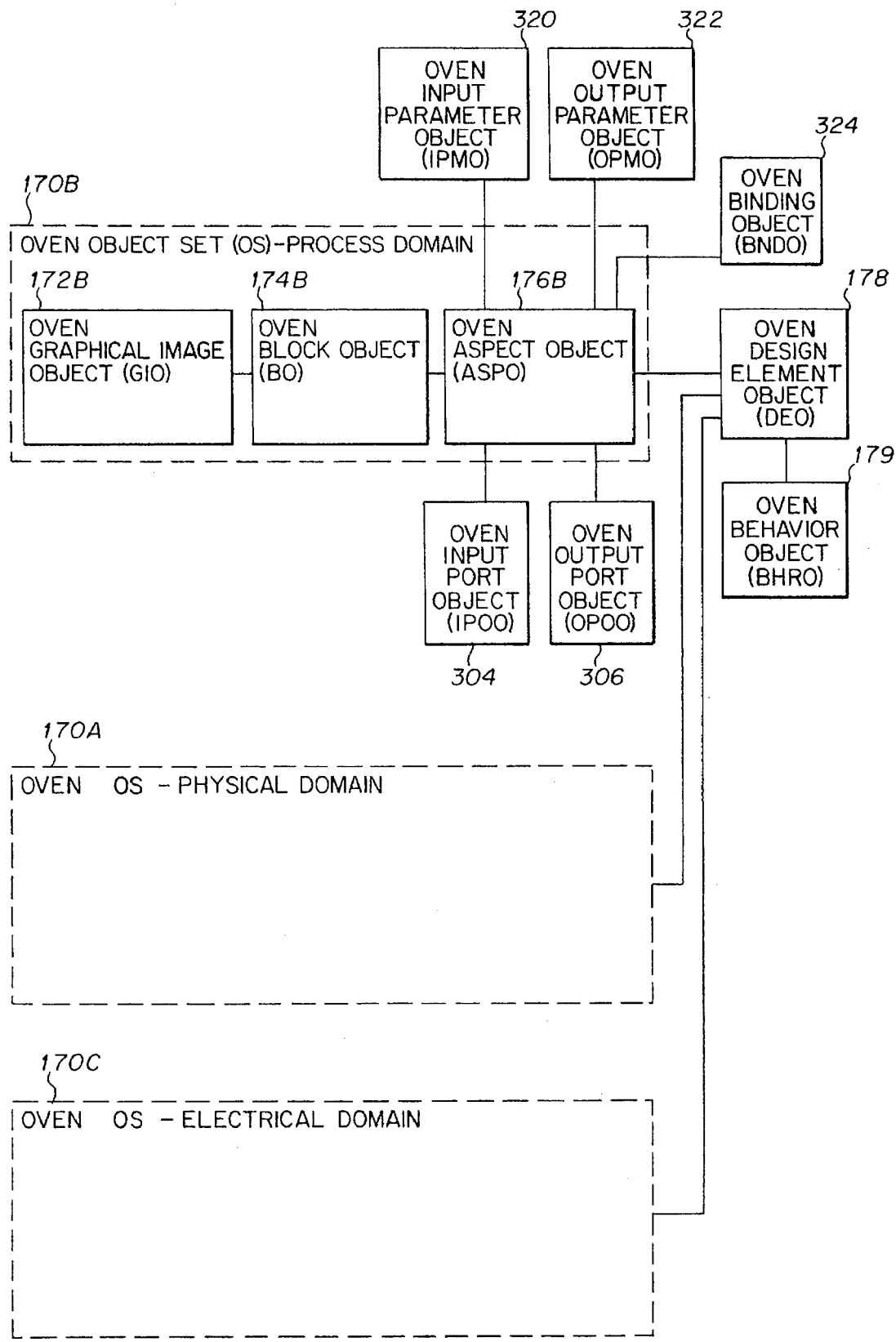
FIG. 7 is a block diagram of object sets, a design element object, parameter objects, port objects, a behavior object and binding object in accordance with the teachings of the invention.

Each object set includes a graphical image object (GIO) which stores displayable image information such as a bitmap, line coordinates, etc. The graphical information defines an image of the represented article in a particular domain. FIG. 7 shows the process domain oven object set 170B as having an oven graphical image object 172B.

Each object set further includes a block object (BO) which is linked to the graphical image object. The block object stores a collection of pointers, one pointer being used to establish half of the link to the graphical image object. The block object uses other pointers to establish links with other block objects of other sets or a root block object (see FIG. 6). Hence, the block object provides the link mechanism that links the object set to other object sets. FIG. 7 shows the oven object set 170B as having an oven block object 174B linked to the oven graphical image object 172B.

Each object set also includes an aspect object (ASPO) which is linked to the block object. The aspect object stores pointers to additional objects of the invention and functions as a message controller for controlling the dissemination of messages throughout the object structure. For instance, the aspect object propagates messages to other aspect objects of the object structure. FIG. 7 shows the oven object set 170B as having an oven aspect object 176B which is linked to the oven block object 174B.

FIG. 6 shows details of the object sets for the conveyor article 43 (130A) and the rack article 44 (140A). In particular, the conveyor1 block object 134A is linked to the physical root block object 62A. Additionally, the conveyor1 block object 134A is linked to both the rack1 block object 144A and the base1 block object (not shown). As described above, the link between the conveyor1 and rack1 block objects 134A and 144A is implemented using pointers.

The functionality of the object set may be partitioned differently and still be within the scope of the invention; the particular partitioning scheme outlined above was chosen because it groups similar functions together making the object set easy to maintain and organize.

Another object data structure of the invention is a design element object (DEO) which identifies an article in the environment which is represented by the object structure. Although the object structure may include more than one object set for each article in the environment, i.e., an object set for each domain, the object structure includes only one design element object for each article of the environment. For example, FIG. 7 shows one design element object 178 and three object sets 170A–170C (one for each of the physical, process and electrical domains) for the oven 47 of the bakery environment 40.

Another object data structure of the invention is a behavior object (BHRO) which stores a behavioral expression that defines a behavior of an article in the environment. Each behavior object is linked to a design element object and defines the behavior of the article identified by the design element object. The behavioral expression may take the form of an equation and include variables or the form of a program control statement and include conditional statements such as if-then statements. FIG. 7 shows a behavior object 179 linked to the oven design element object 178.

Another object data structure of the invention is an attribute object. An attribute object is linked with an aspect object and takes the form of an input parameter object (IPMO), output parameter object (OPMO), or a binding object (BNDO). An input parameter object stores upper and lower input parameter limits of a value which may be accepted by the aspect object. An output parameter object stores a value which is outputted by the aspect object. FIG. 7 shows both an input and output parameter object 320 and 322 linked to the oven aspect object 176B.

A binding object enables a user to attach an external file to an object set that represents an article in the environment, and to access information stored in the external file with the program 38. In particular, the binding object stores both a file name that identifies the external file and an application type that identifies an external application. FIG. 7 shows an oven binding object 324 linked to the oven aspect object 176B.

Another object data structure of the invention is a port object. The port object takes the form of either an input port object (IPOO) or an output port object (OPOO), both of which are linked to an aspect object. An output port object provides a mechanism for passing a message from the aspect object to another aspect object in the object structure. An input port provides a mechanism for passing a message to the aspect object from another aspect object in the object structure. FIG. 7 shows both an input port object 304 and an output port object 306 linked to the oven aspect object 176B.

Figure 9:
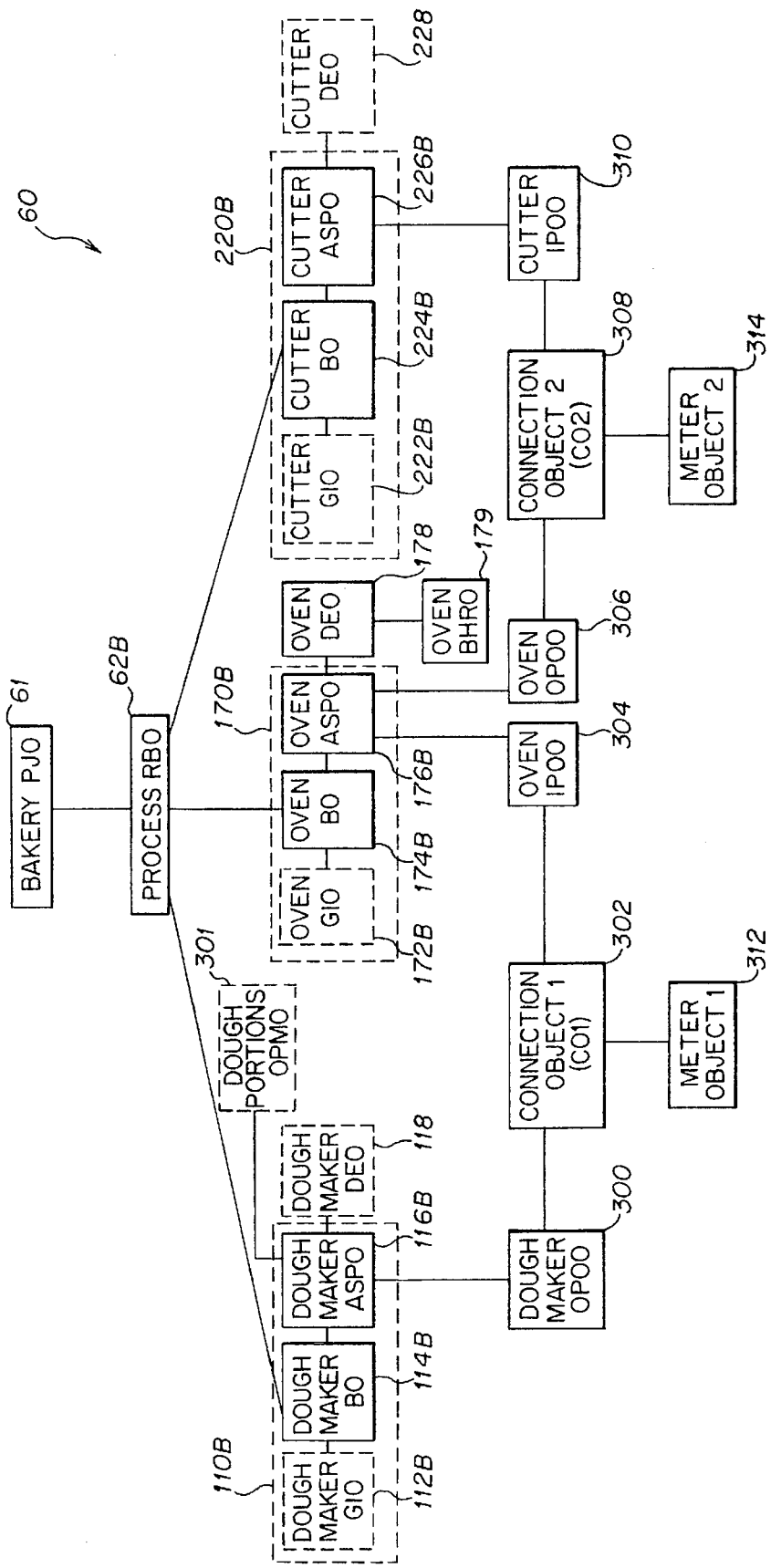
FIG. 9 is a block diagram of a portion of the object structure that represents a portion of the process domain of the environment of FIG. 2, and further including a parameter object, port objects, connection objects and meter objects in accordance with the teachings of the invention.

Another object data structure of the invention is a connection object (CO) which relays messages from one port object to another port object. Each connection object may be linked to two port objects. FIG. 9 shows connection objects 302 and 308 linked to port objects 300, 304 and 306, 310, respectively.

Each port object and each connection object may additionally have an associated image object linked to it that stores image information about the port or connection. Additionally, each connection object may be linked to a meter object that stores a meter image related to the connection. FIG. 9 shows meter object 312 and 314 being linked to connection objects 302 and 308, respectively.

Having provided a description of the object structures of the invention, further features of the object structure will now be discussed.

The design team creates a project called "Bakery" by entering a "create project" command on the input device 35.

Figure 11:
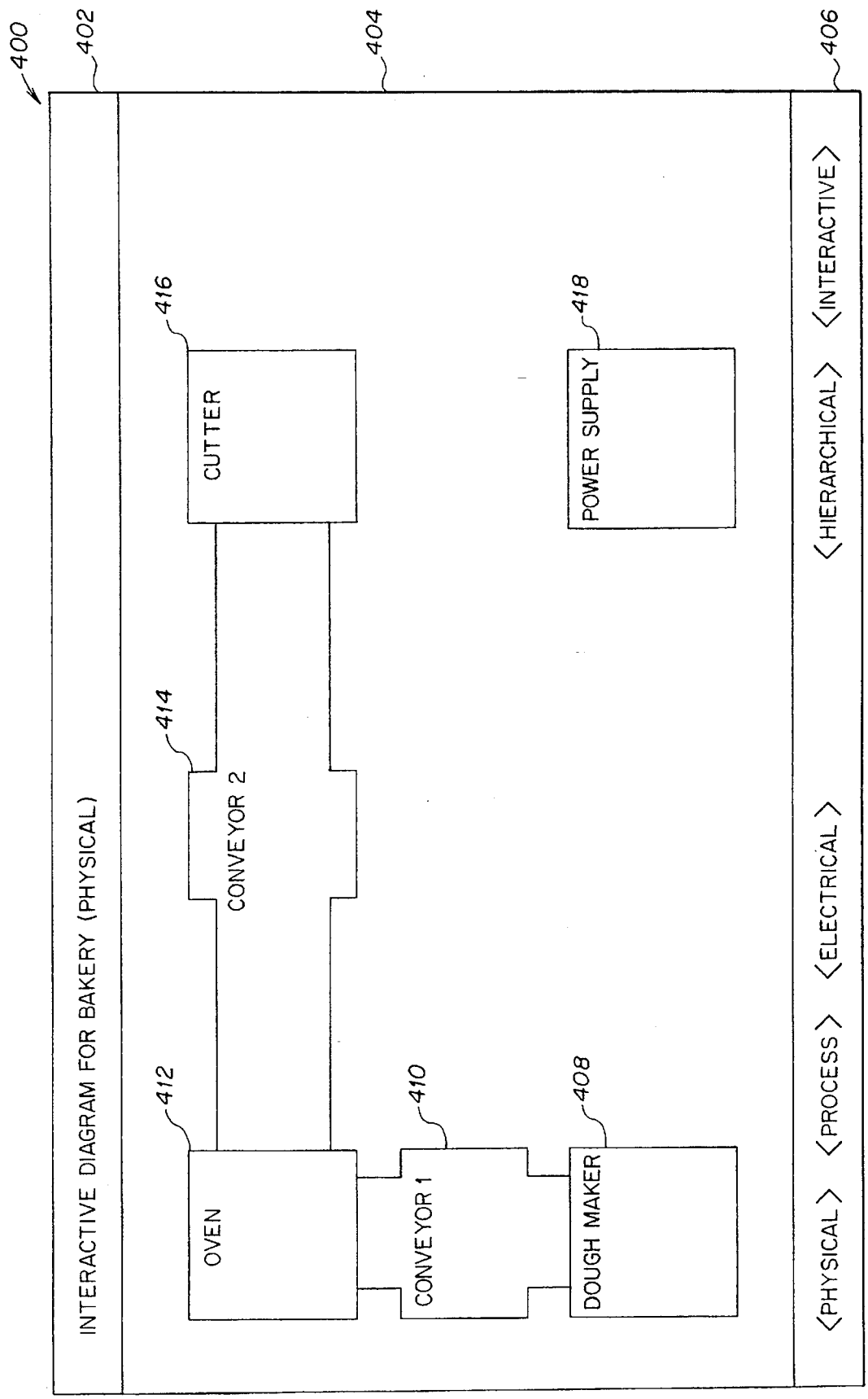
FIG. 11 is a window showing an interactive diagram of the environment of FIG. 2 in the physical domain.

Program 38 responds by creating a bakery project object 61 (see FIG. 6) and storing it in the memory 34. Then, a design team member such as the plant engineer creates a floor plan of the bakery as shown in FIG. 11 by entering additional commands and information into the input device 35.

To create the floor plan, the plant engineer enters a "build domain" command and a domain name, i.e., "Physical". The program 38 responds by displaying an empty interactive diagram window 400 on the display device 36 (see FIG. 11). The interactive diagram window has a title bar 402, diagram portion 404, and a menu 406. The plant engineer then adds graphical images to the diagram portion 404 by incrementally creating one graphical image at a time and naming it with the name of the article to be represented. For instance, the plant engineer may first add an oven image 412 and name it "oven" by entering a "create article image" command and the "oven" article name, and adding graphical image data that depicts the oven in the physical domain. The graphical image data could simply be a box, vector drawing or alternatively an elaborate bitmap either created with drawing methods similar to the drawing tools provided with Microsoft Windows or any equivalent software package or provided on a diskette by the oven manufacturer. The plant engineer perceives only the creation of the interactive diagram window 400 and the oven graphical image in the diagram portion 404 of the interactive diagram window 400 even though other objects are created.

However, when the plant engineer enters the "build domain" command to create a physical domain as explained above, the program 38 creates a root block object 62A to represent the physical domain (see FIG. 6). Next, the program 38 links the physical root block object 62A to the project object 61. When the plant engineer enters the "create article images" command, the program 38 creates an oven design element object 178 (see FIG. 7) that stores the name "oven" to represent the oven article 47. Additionally, as shown in FIG. 7, the program 38 creates a set of objects 170A (or object set) that includes an oven aspect object, an oven block object, and an oven graphical image object. The oven graphical image object contains graphical information that the program uses to create the oven graphical image 412 in the interactive diagram window 400. The operation of the block object and the aspect object will be explained later.

When the plant engineer enters the "create graphical image" commands to add the graphical images for each of dough maker 41, conveyors 43 and 49, oven 47, and cutter 52, the program 38 incrementally creates an object set for each article (see FIG. 6). Accordingly, each time the plant engineer adds a new graphical image to the interactive diagram window 400, the program 38 creates a new design element object, aspect object, block object, and graphical image object to represent the article. The program 38 links each object set to the physical root block object 62A.

Figure 12:
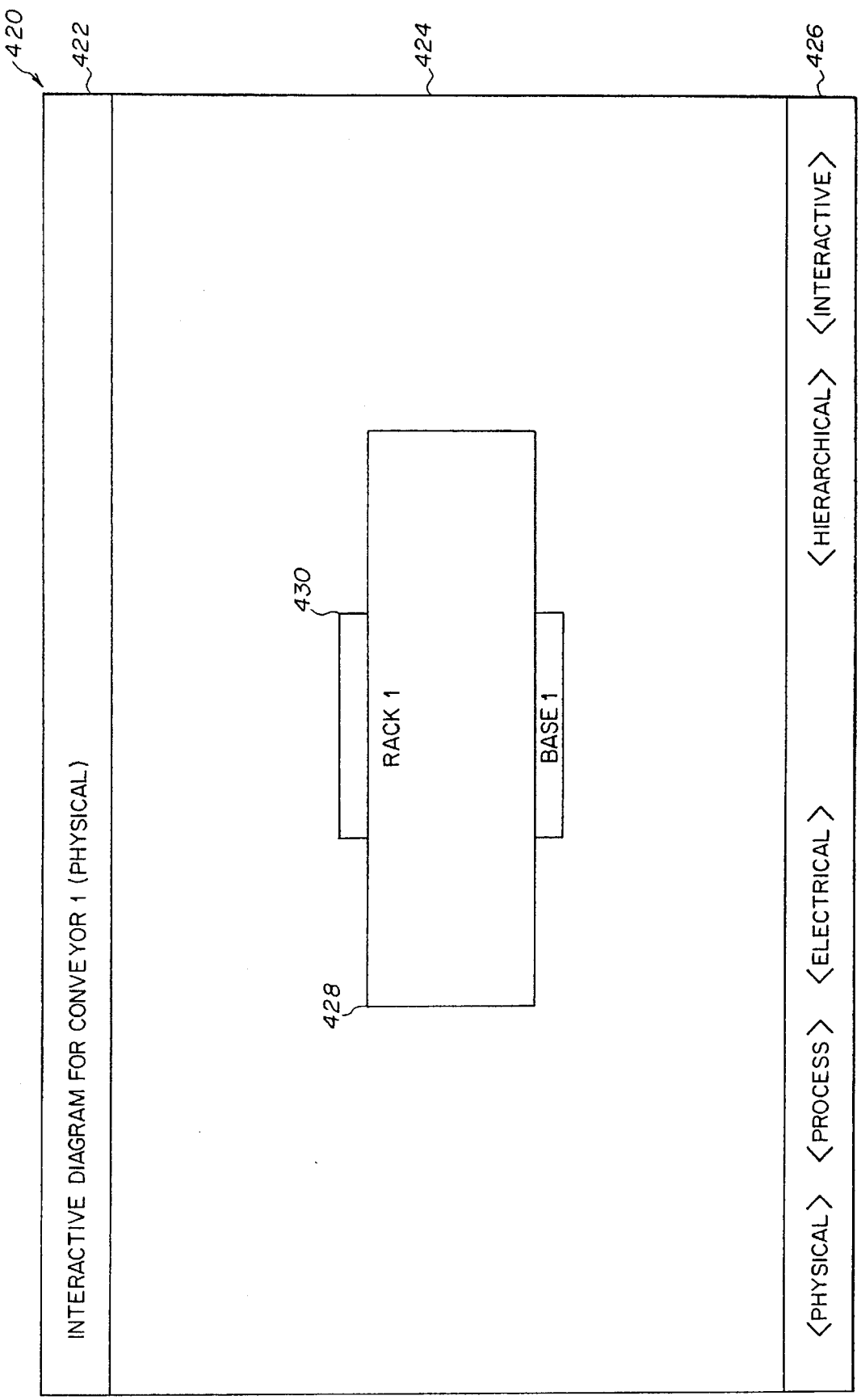
FIG. 12 is a window showing an interactive diagram of the contents of an article of the environment of FIG. 2 in the physical domain in accordance with the teachings of the invention.

In addition to designing the floor plan of the bakery, the plant engineer may desire to model the physical relationship of the conveyor 43, i.e., create a representation of its rack portion 44 and base portion 45. To this end, the plant engineer selects the conveyor1 image 410 (see FIG. 11) and enters another "create article image" command. The plant engineer may select the conveyor1 image 410 by moving a mouse (part of input device 35) so that a mouse cursor is positioned over the conveyor1 image 410, and clicking a mouse button. The program 38 responds to the selection by highlighting the conveyor1 image 410 (e.g., flashing portions of the graphic image or displaying the conveyor1 image 410 in a different color). As shown in FIG. 12, the program 8 responds to the new "create article image"

command by displaying a new empty interactive diagram window 420. The plant engineer then proceeds to add new graphical images for the rack portion 44 and the base portion 45 to the new interactive diagram window 420. The program 38 responds by creating a design element object and an object set (i.e., an aspect object, a block element object, and a graphic image object) for each of the newly added graphical images.

FIG. 6 shows the object sets 140A and 150A for the rack portion 44 and the base portion 45, respectively. FIG. 12 show the rack image 428 and the base image 430 defined by the object sets 140A and 150A. The program 38 considers the newly added objects as representing an article that is a direct component of the conveyor article 43 rather than an article of the floor plan shown in FIG. 11. Accordingly, the object sets 140A and 150A are linked to the conveyor1 object set 130A rather than the physical root block object 62A since the plant engineer was working in the interactive diagram window 420 for the conveyor1.

In this manner, the plant engineer may construct an object structure 60, a portion of which is shown in FIG. 6 to represent the physical domain of the environment.

Figure 13:
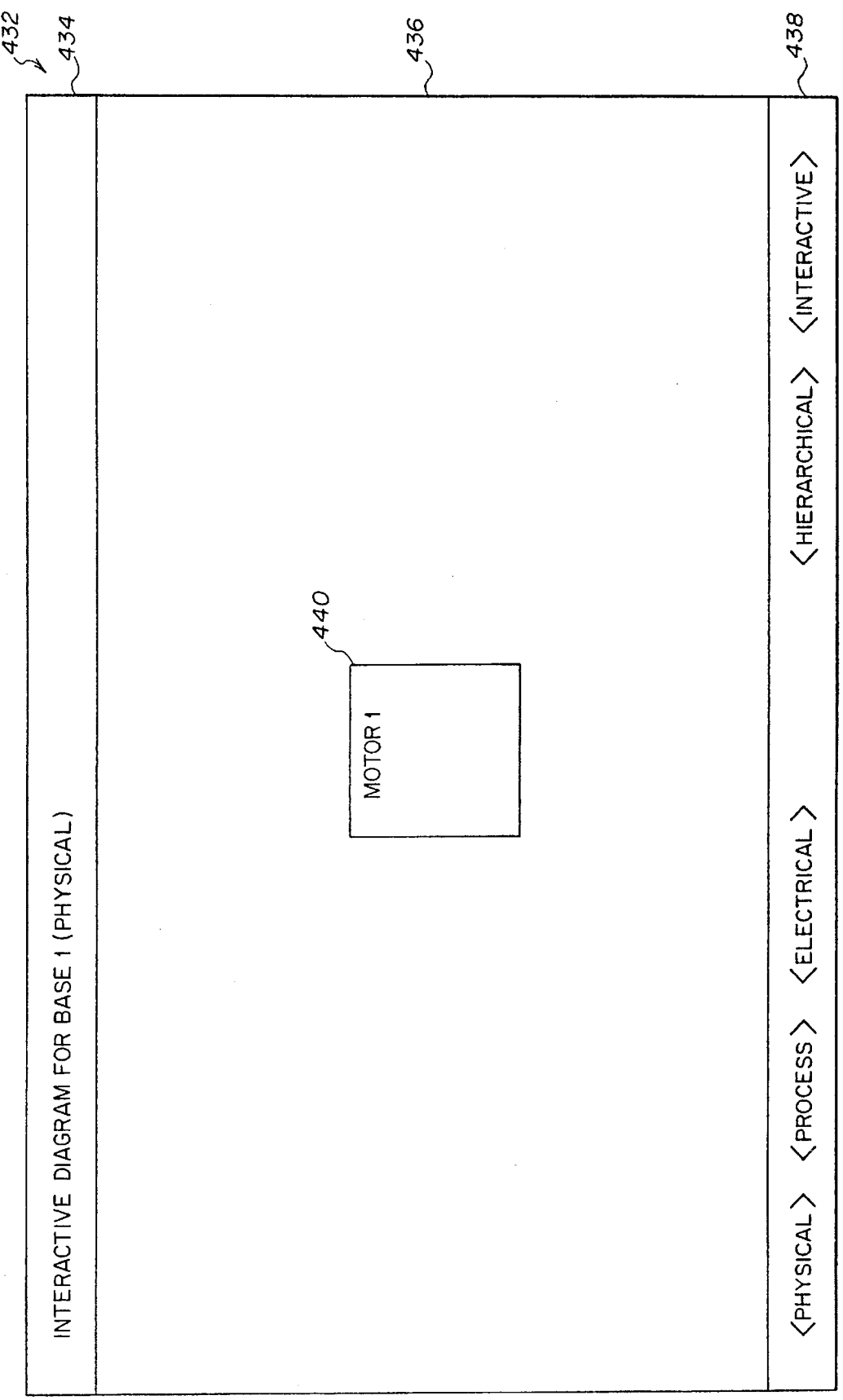
FIG. 13 is a window showing a diagram of the contents of an article of the environment of FIG. 2 in the physical domain in accordance with the teachings of the invention.

To add a new graphical image to represent the motor article 46, as shown in FIG. 13, as a component of the base portion image 430, the plant engineer (1) selects the base portion image 430 of interactive diagram window 420 (see FIG. 12) with the mouse, thereby highlighting the base portion image 430, (2) enters the "create graphical image" command, thereby creating a new empty interactive diagram window 432 as shown in FIG. 13, and (3) enters the "create graphical image" command within the new interactive window 432. The program 38 responds by creating an object set 160A, as shown in FIG. 6, that represents the motor1 article 46 and incorporating the object set 160A into the object structure 60. FIG. 6 shows the hierarchy of block objects created by the program 38 when the plant engineer finishes adding design information to represent the physical domain of the bakery 40 as described above.

Figure 8:
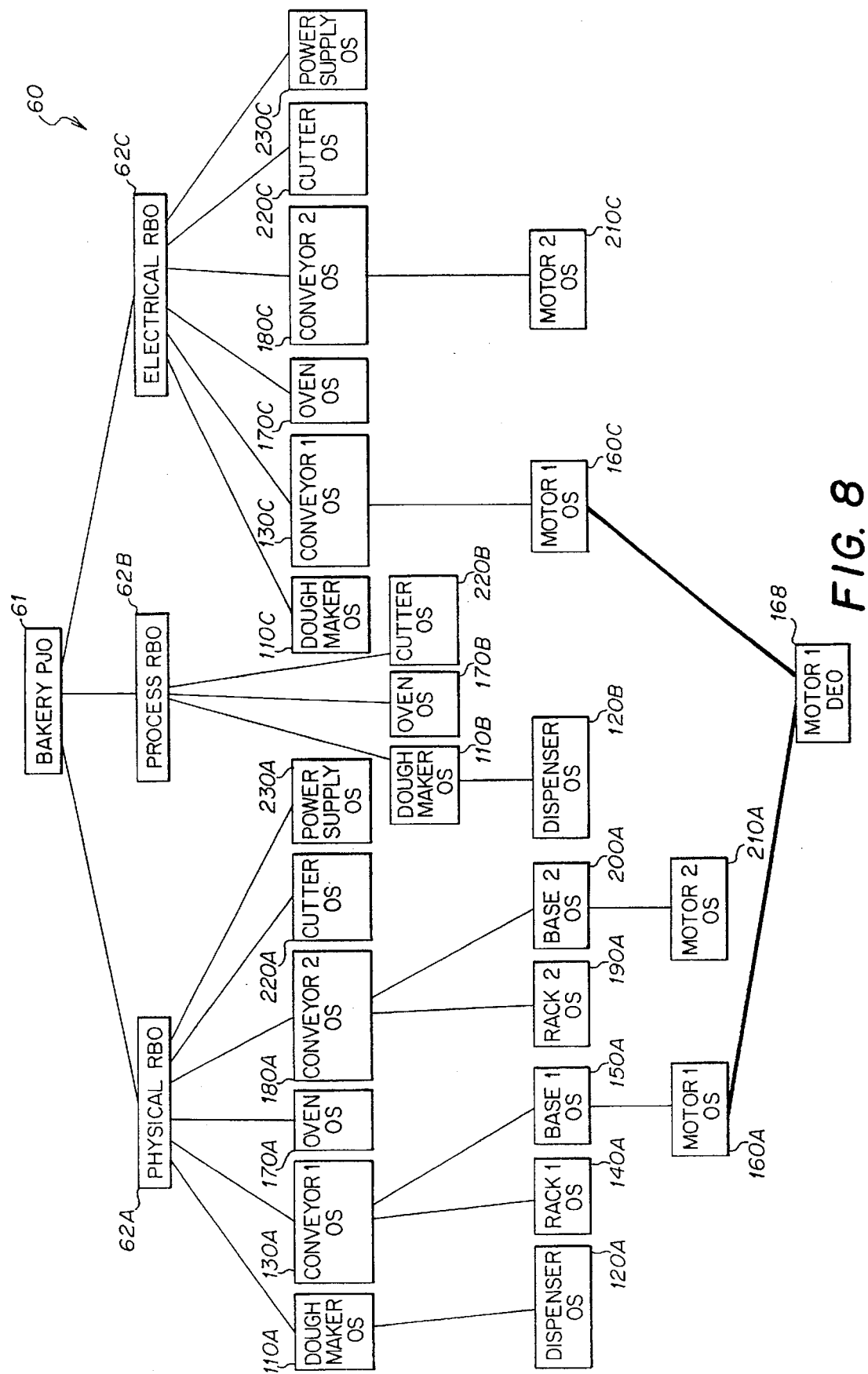
FIG. 8 is a block diagram a portion of the object structure that represents the physical domain, the process domain, and the electrical domain of the environment of FIG. 2, in accordance with the teachings of the invention.
Figure 14:
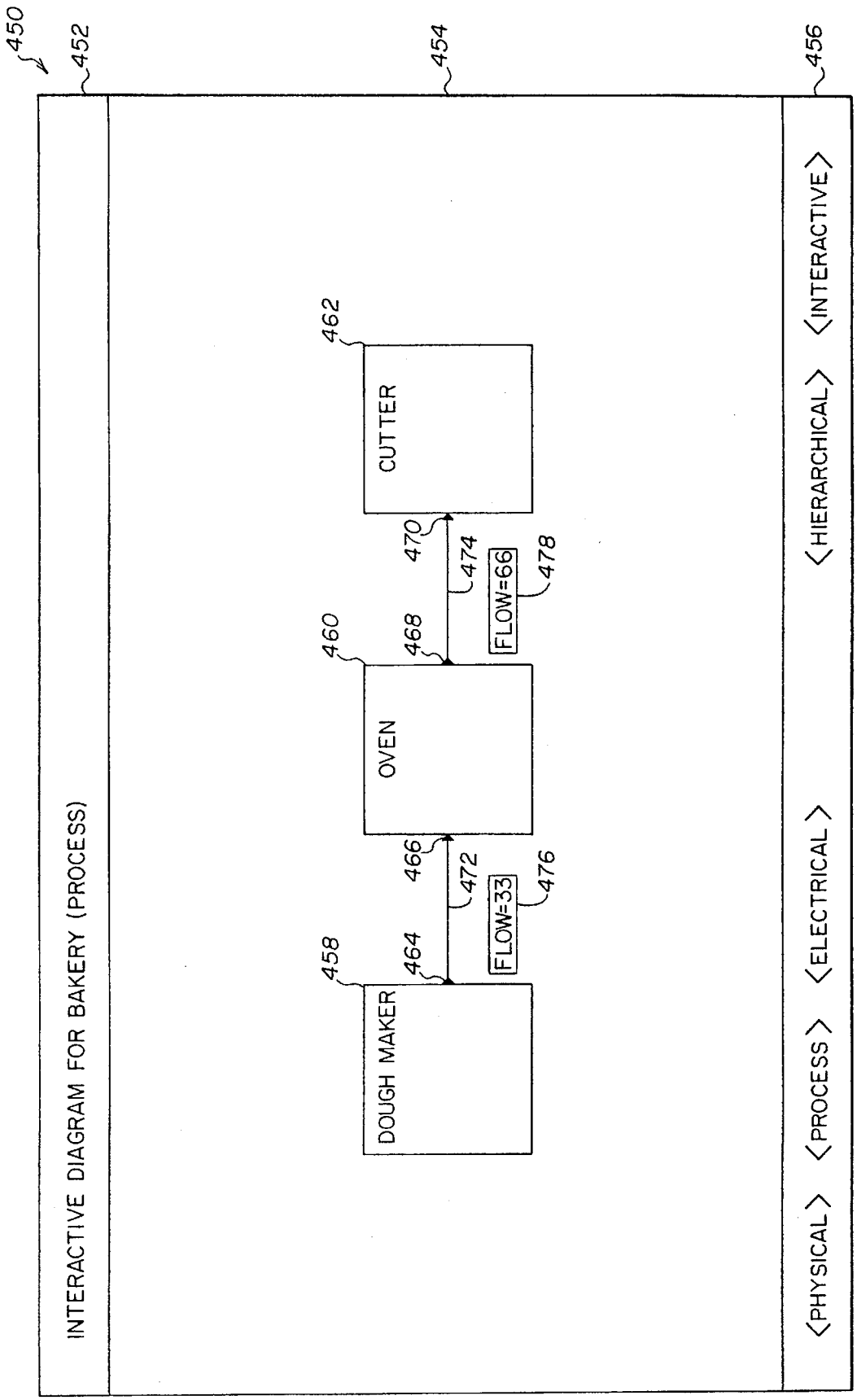
FIG. 14 is a window showing an interactive diagram of the environment of FIG. 2 in the process domain in accordance with the teachings of the invention.

To add the design information from the list 56 that relates to the process of the bakery 40 (see FIG. 4), the process engineer enters the "build domain" command and the same "Process" to build the process domain. The program 38 responds by creating a process root block object 62B and linking it with the bakery project object 61 as shown in FIG. 8. The process engineer then proceeds to enter design information using the same procedure as the plant engineer except that the process engineer enters information relating to the bakery process rather than the physical features of the bakery. The program 38 responds to "create graphical image" commands by creating both an object set and a design element object if the article name specified with the command is new to the system (i.e., unique). If, however, the article name matches a previously entered article name, the program 38 determines that the article is already represented in a different domain, and creates only a new object set (i.e., an aspect object, a block object, and a graphical image object) to represent the article. The program 38 uses the same design element object, if available, that was created earlier and links it to a new object set. For example, FIG. 14 shows an interactive diagram window 450 for the process domain. When the process engineer adds a graphical image to represent the oven article 47 in the diagram portion 454 of the interactive diagram window 450, the program 38 adds object set 170B containing oven aspect object 176B, oven block object 174B, and oven image object 172B (see FIG. 7). Since the oven design element object 178 already exists (i.e., it was created when the plant engineer created the oven image in the physical domain), the program 38 simply links the oven design element object to the oven object set 170B.

The electrical engineer then adds design information relating to the electrical domain of the bakery 10 using the same procedure used by the plant and process engineers. A portion of the resulting object structure 60 after the design team completes entering the design information is shown in FIG. 8. The object structure 60 has three domain branches (identified by the physical, process, and electrical root block objects 62A, 62B, and 62C, respectively), each originating from a root block object that is linked with the bakery project object 61. Only the motor1 design element object 168 is shown in FIG. 8 for simplicity. However, each object set is linked to a design element object which, as will be discussed later, serves to link the object sets for a given article in the various domains.

The program 38 creates other objects in response to additional user commands. For instance, the process engineer may also add behavioral information describing the operation of the bakery 40. In particular, while viewing the interactive diagram window 450 in FIG. 14, the process engineer may select the dough maker image 458, enter a "create output parameter" command, and a name "dough__portions". The program 38 responds by creating a dough__portions output parameter object 301 as shown in FIG. 9 and linking it with the dough maker aspect object 116B of the process domain. The process engineer then enters a "create output port" command and names it "dough__portions" while the dough maker image 458 is still selected. The program 38 responds by creating an output port object 300, linking the output port object 300 to the dough maker aspect object 116B, associating the output port object 300 with the dough__portion parameter object 301, and displaying an output port graphical image 464 along the edge of the dough maker image 458 (see FIG. 14). Additionally, the process engineer selects the oven image 460 and enters a "create behavior" command and an expression "baked__loaves= dough__portions×2" indicating that oven article 47 creates two baked loaves of bread for every dough portion it receives from the oven. In response, the program 38 creates a behavior object 179 (FIG. 9) and links it with the oven design element object 178.

Furthermore, the process engineer enters a "create input port" and names it "dough__portions" while the oven image 460 is still selected. The program 38 responds by creating, as shown in FIG. 9, an input port object 304, linking the input port object 304 to the oven aspect object 176B, and displaying an input port image 466 along the edge of the oven image 460. As will be explained later, this enables expressions stored within a behavioral object to receive updated values from an input port object (i.e., through the aspect object and design object). Then, the process engineer connects the output port image 464 with the input port image 466. This connecting operation is performed by entering connection information into the input device 35 such as by moving the cursor over the output port image 464, clicking the mouse button, moving the cursor over the input port image 466 and clicking the mouse button. The program 38 responds by creating a connection object 302, linking the connection object 302 to both the output port object 300 and input port object 304 (see FIG. 9), and displaying a connection image 472 to indicate that the dough maker image 458 provides output to the oven image 460 (see FIG. 14). The connection object 302 includes image information that enables the program 38 to display the connection image 472. Optionally, the connection object may be linked with a separate connection image object which stores the connection image information similar to the way the block object is linked to the graphic image object. Also optionally, the connection object 302 may be linked to a meter object 312 that displays a meter image 68 showing flow information, e.g., "Flow=dough_portion".

Similarly, the process engineer enters commands to create an output port object for the oven aspect object 176B (see FIG. 9) and an output port image 468 (see FIG. 14) is displayed. The process engineer then selects the cutter image 462 and enters commands to create an input port object 310 (see FIG. 9) and an input port image 470 (see FIG. 14.) Then, the process engineer connects the output port image 468 with the input port image 470 which causes the program 38 to create a connection object 308 and link it to port objects 306 and 310 (see FIG. 9). As explained earlier, a meter object 314 may be linked to the connection object 308. Accordingly, the interactive diagram window 450 of FIG. 14 shows a connection image 474 and a meter image 478.

Figure 10:
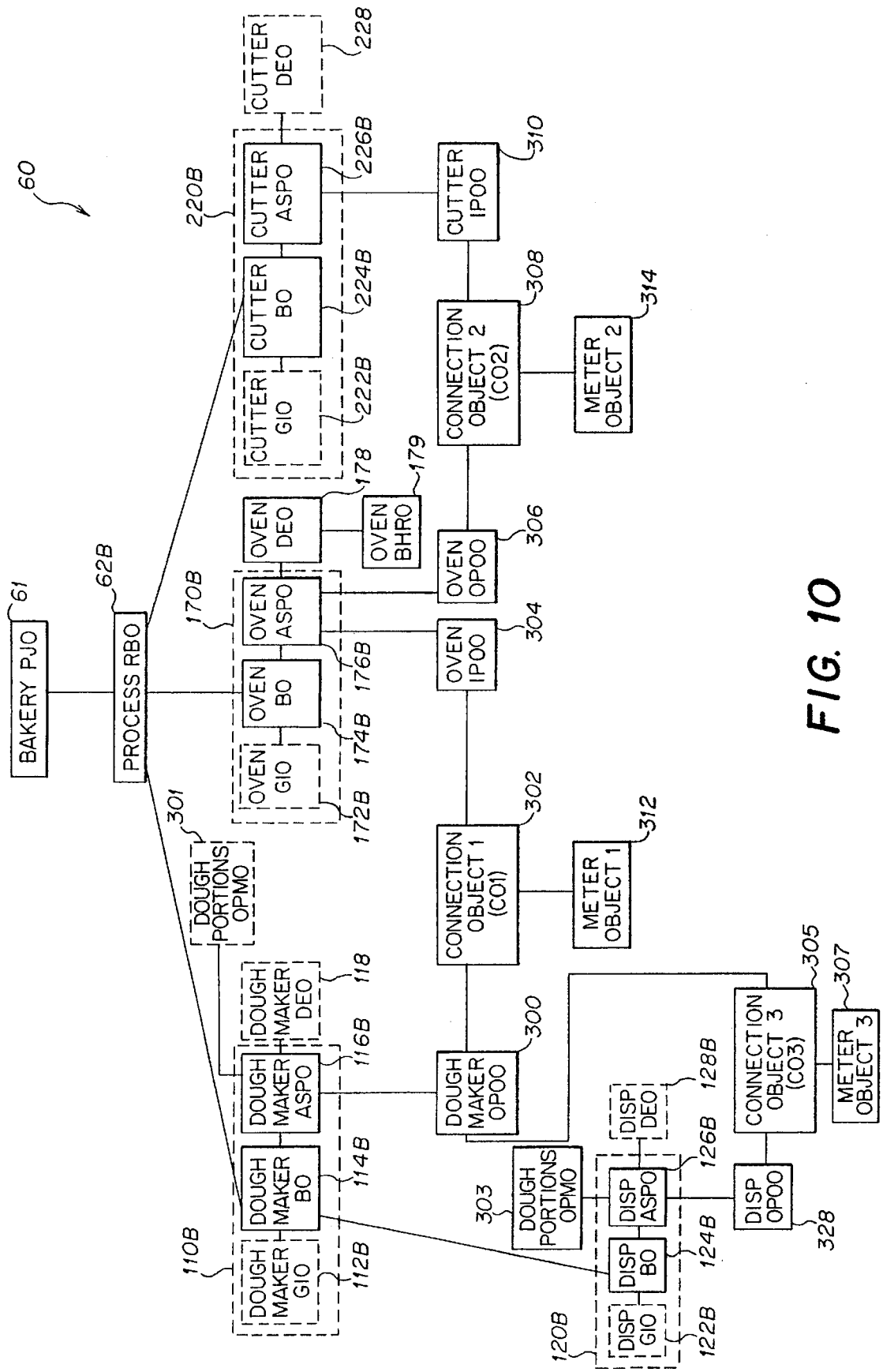
FIG. 10 is a block diagram of a portion of the object structure that represents the process domain of the environment of FIG. 2, and further including parameter objects, port objects, connection objects and meter objects in accordance with the teachings of the invention.
Figure 15:
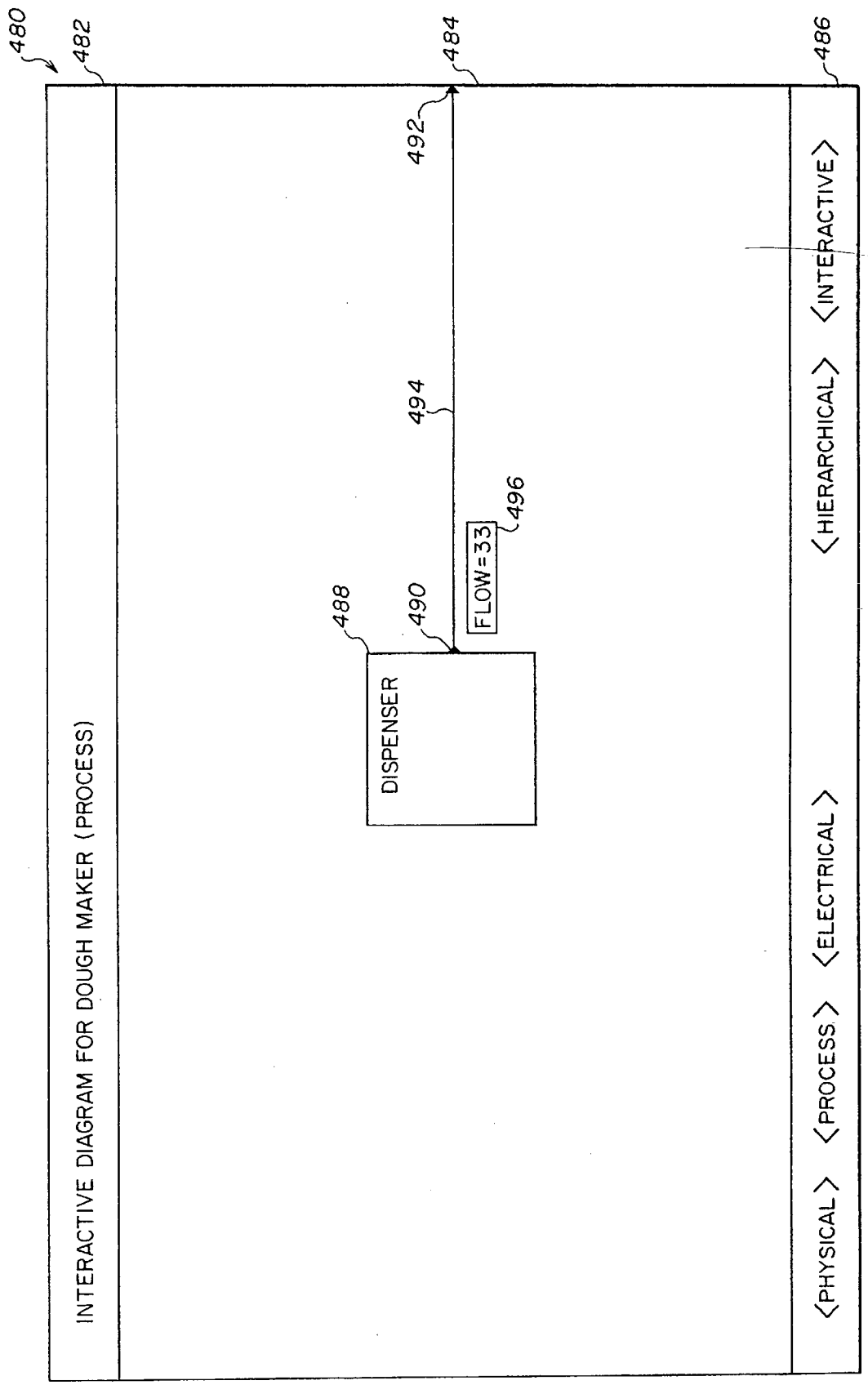
FIG. 15 is a window showing an interactive diagram of the contents of an article of the environment of FIG. 2 in the process domain in accordance with the teachings of the invention.

The portion of the object structure 60 shown in FIG. 10 includes a dispenser design element 128B. The dispenser article 42 is a component of the dough maker article 41 as represented by the link between the dispenser object set 120B and the dough maker object set 110B. Accordingly, as shown in FIG. 15, the program 38 displays the interactive diagram window 480 showing a dispenser image 488 in a diagram portion 484. The process engineer may represent the dispenser article 42 as providing the dough portions to the oven article 47 by connecting the dispenser image 488 to an output port image 492 positioned on the edge of the diagram portion 484. The process engineer uses the same steps as performed on the dough maker image 458 (see FIG. 14) to create an output port image 490 (see FIG. 15) with the dispenser image 488 being selected. In particular, the process engineer enters the "create output parameter" command and the name "dough_portions" to create an output parameter object 303 (see FIG. 10) named "dough_portions" and link it to the dispenser aspect object 126B. Then, the process engineer enters the "create output port" command and the name "dough_portions" while the dispenser image 488 is still selected to (1) create an output port object 328, (2) link output port object 328 to the dispenser aspect object 126B, (3) associate the output port object 328 with the "dough_portions" output parameter object 303, and (4) display an output port image 490 (see FIG. 15) along the edge of the dispenser image 488. The input port image 492 already exists due to the creation of the output port object 300 (see FIG. 10) which is linked to the dough maker aspect object 116B as described above. Then, the process engineer connects the output port image 490 to the input port image 492 using the mouse causing the program 38 to create a connection object 305 and a meter object 307, and display a connection image 494 and a meter image 496 as shown in FIG. 15.

Figure 16:
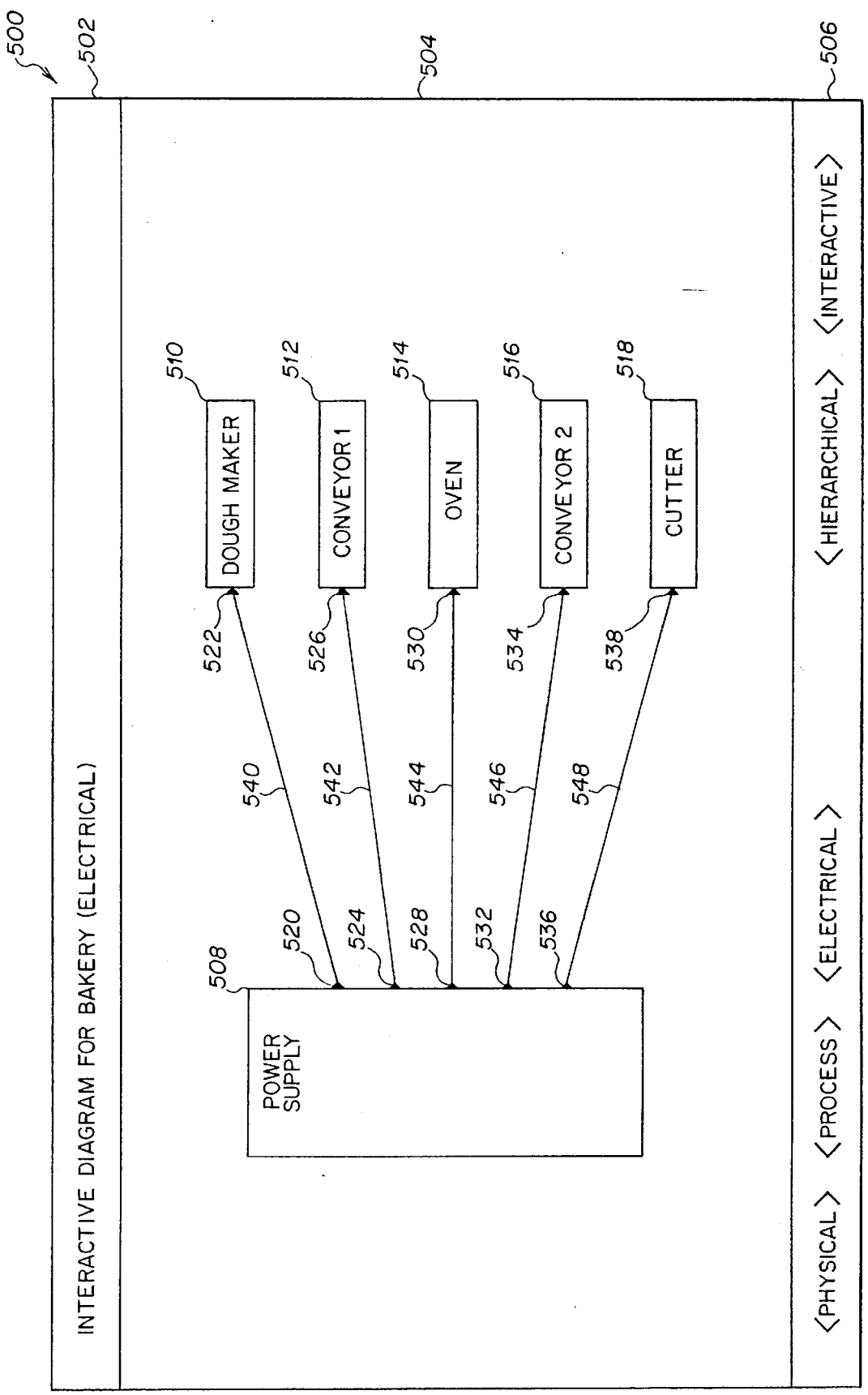
FIG. 16 is a window showing an interactive diagram of the environment of FIG. 2 in the electrical domain in accordance with the teachings of the invention.
Figure 17:
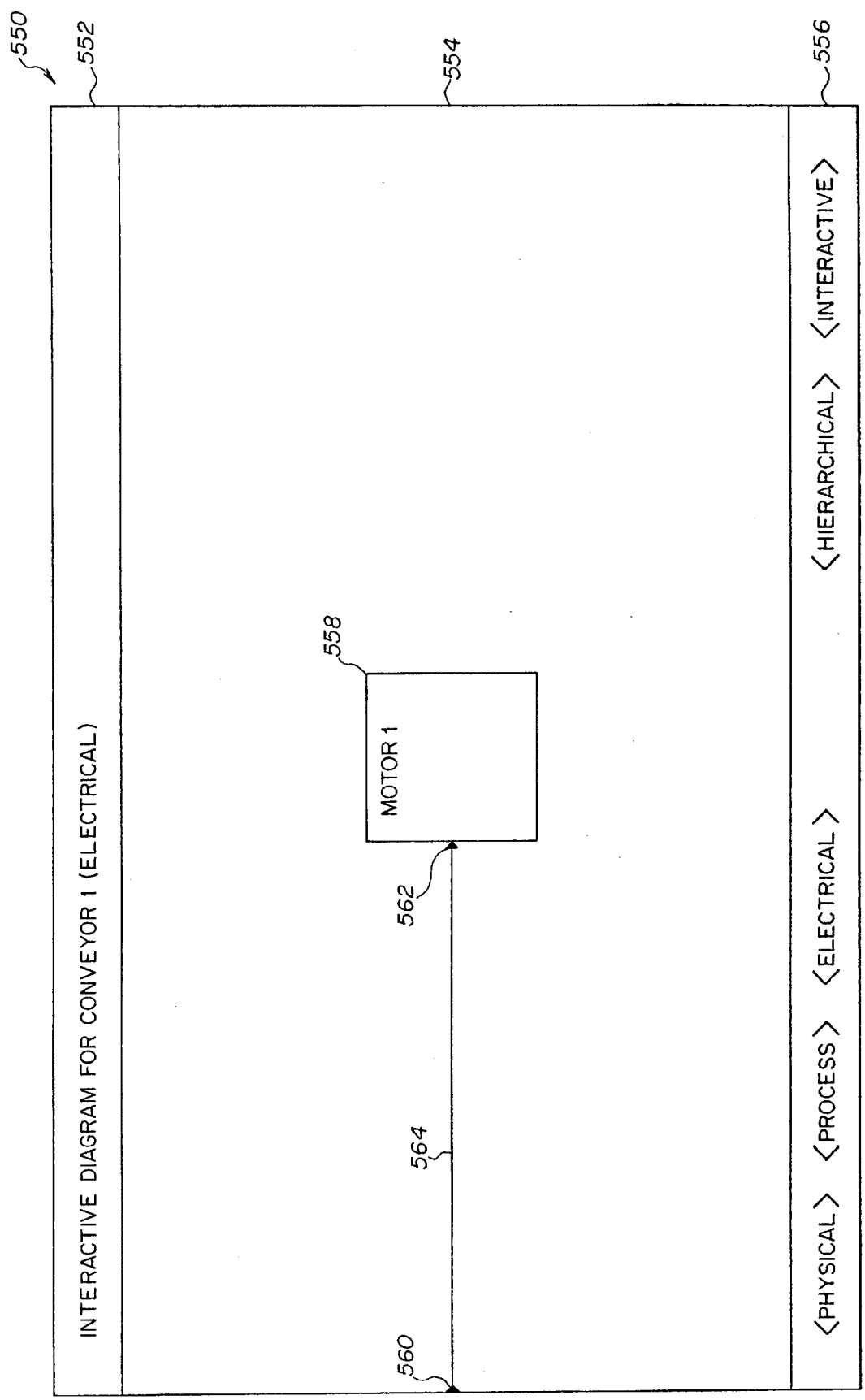
FIG. 17 is a window showing an interactive diagram of the contents of an article of the environment of FIG. 2 in the electrical domain in accordance with the teachings of the invention.

The electrical engineer likewise adds connections from the power supply image 508 to the other images (510, 512, 514, 516 and 518) as shown in the diagram portion 504 of the interactive diagram window 500 of FIG. 16. In response to the electrical engineer's commands to add the connections, the program 38 creates input port objects, connection port objects and output port objects and then links them appropriately. Additionally, the motor1 image 558 shown in FIG. 17 may be connected to the power supply by the electrical engineer entering a "create input port" command to create an input port image 562 along the edge of the motor1 image 558 and connecting the output port image 560 to the input port image 562 using the mouse.

The invention enables the design team members to bind files to an article image in an interactive window. For instance, the process engineer may wish to bind a text file containing process information for the oven article 47 to the oven image 460 (see FIG. 14). The process engineer may use a third party application such as Microsoft Word or any other suitable word processor to create the text file, may enter it into the system from a vendor supplied diskette, or other media or may obtain the file in some other suitable manner. To bind the file to the oven image 460, the process engineer selects the oven image 460 using the mouse, enters a "bind file" command, and specifies the filename and the application tool type that identifies the type of application that uses the file. In this case, the process engineer specifies "oven.doc" as the filename for the text file and "word processor" as the application tool type. The program 38 responds by creating an oven binding object 324 (see FIG. 7) that includes the filename and the application tool type, and linking the binding object to the oven aspect object 176B.

When the binding object receives a "launch" command, the binding object invokes the external application so that the external application uses the external file. The binding object invokes the external application so that the external application uses the external file. The binding object may use any type of browser to retrieve the external file. For example, the binding object may use an SQL query command to access a database, or send a signal to an external document management system. Additionally, the binding object may use a variety of methods to locate and invoke the external application. For instance, the binding object may use the Windows Registration Database feature provided by Microsoft Windows to locate and invoke a specific tool set that uses the external file. Moreover, it is possible for the binding object to locate and invoke Wordperfect on one computer system and Microsoft Word on another computer system according to the "word processing" application type, since the Windows Registration Database is separate from the application type.

As described earlier, each link between two objects of the object structure 60 is implemented with a pair of pointers. For instance, the link between an aspect object and a block object, is implemented by the aspect object having a pointer to the location in the memory 4 of the block object and the block object having a pointer to the location in the memory 4 of the aspect object. Since all of the objects in the structure are linked, the particular location of an object is irrelevant as long as it can be addressed and accessed by another linked object, i.e., another object having a pointer that stores the memory address of the object. This feature provides flexibility in storing the object structure 60 in the memory 4.

Having thus described further details of the object structure 60, a explanation of the how the object structure 60 is used will now be provided.

The program 38 provides several services to the design team. Namely, the program 38 enables each member of the design team to (1) view the computerized representation of the bakery from different domains, (2) navigate through different views of the computerized representation, and (3) make changes to the computerized representation and automatically distribute the changes throughout the computerized representation so that the other members of the bakery design team are apprised of the changes. These operations are accomplished by the program 38 utilizing the object structure 60.

Each member of the design team may view any domain of the computerized representation. For example, for the program 38 to display the interactive diagram window 400 of FIG. 11, the program 38 locates the first level of object sets of the physical branch of the object structure 60 (see FIG. 6). However, the program 38 must access each object set of the first level through physical root block object 62A since it is the physical root block object 62A that has a collection of pointers to each of the first level object sets. The program 38 then accesses the graphical image information in each of the graphical image objects of the first level object sets through the links between each block object and its graphical image object. Additionally, the program 38 accesses each of the aspect objects of the first level object sets and finds any port objects and connection objects. By traversing the paths from block object, to aspect object, to port object, to connection object, the program 38 collects the image information for displaying the images in the diagram portion 404 of window 500 (see FIG. 11).

Figure 18:
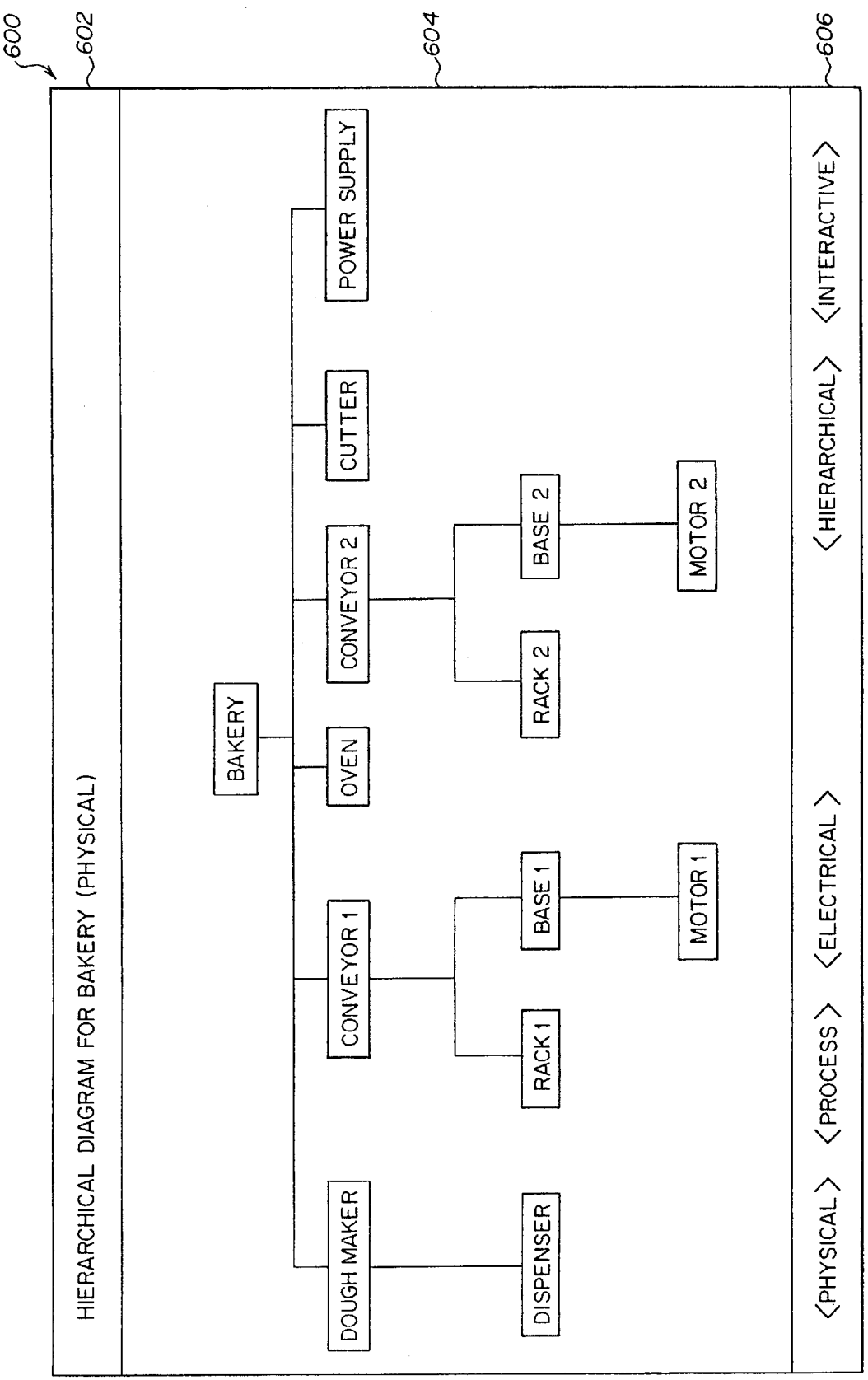
FIG. 18 is a window showing a hierarchical diagram of some of the articles in the environment of FIG. 2 in the physical domain in accordance with the teachings of the invention.

The program 38 may also display an entire hierarchical diagram of a particular domain. For example, FIG. 18 shows the hierarchical diagram window 600 for the physical domain of the bakery 40. In particular, the program 38 locates the appropriate root block to be displayed such as the physical root block 62A (see FIG. 8). Then, the program 38 traverses the entire domain branch of the object structure to determine the hierarchy. Only the block objects of each object set need to be traversed since they contain the links to other block objects. The program 38 follows each sub-branch of a domain branch until it reaches a block object with no pointers to child block objects indicating that there are no children. The program 38 traverses the path from each block object through the aspect object to the design element object to get the name of the article represented. Alternatively, the name of the article represented may be stored in the representing block object for convenience.

Figure 19:
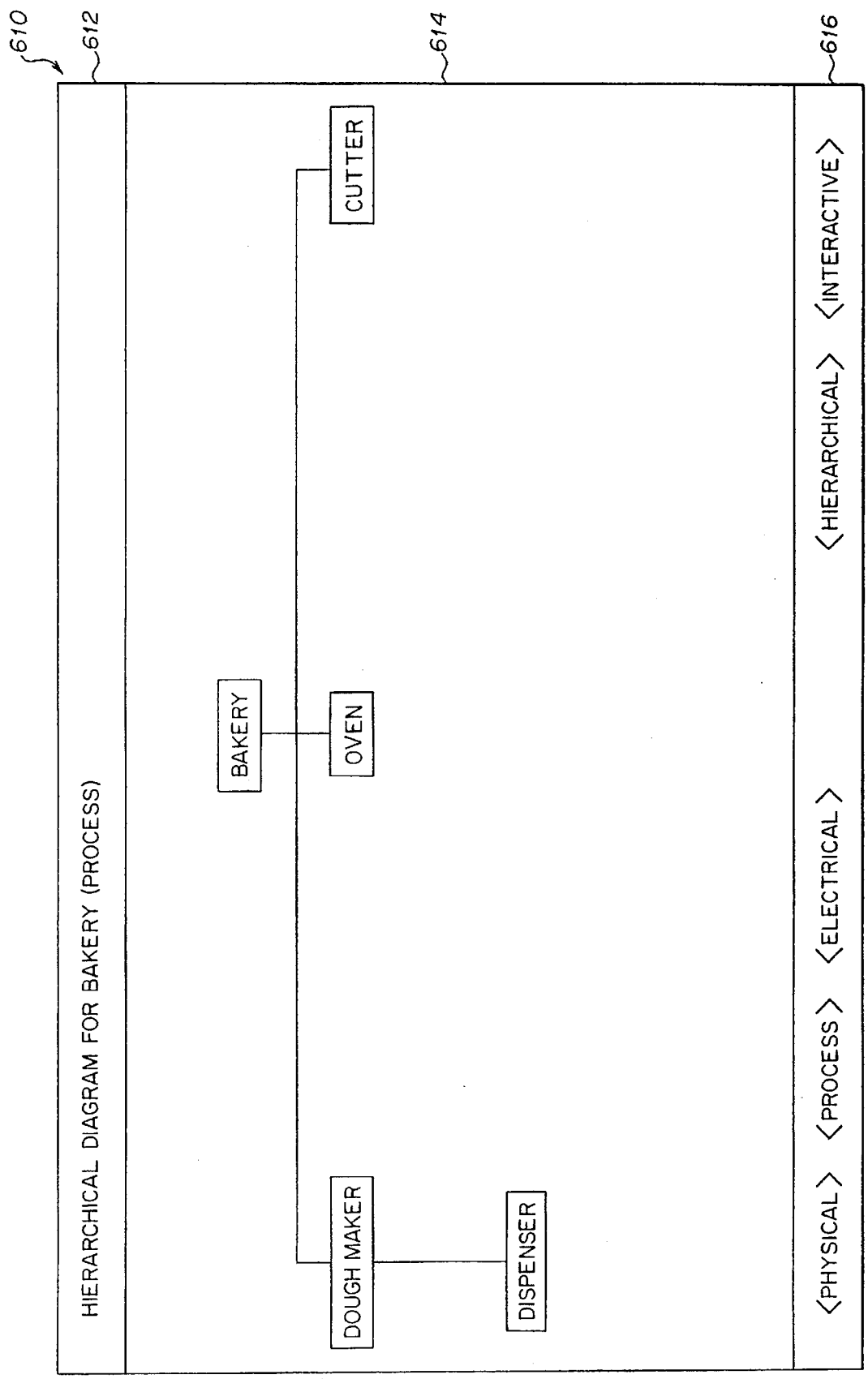
FIG. 19 is a window showing a hierarchical diagram of some of the articles in the environment of FIG. 2 in the process domain in accordance with the teachings of the invention.
Figure 20:
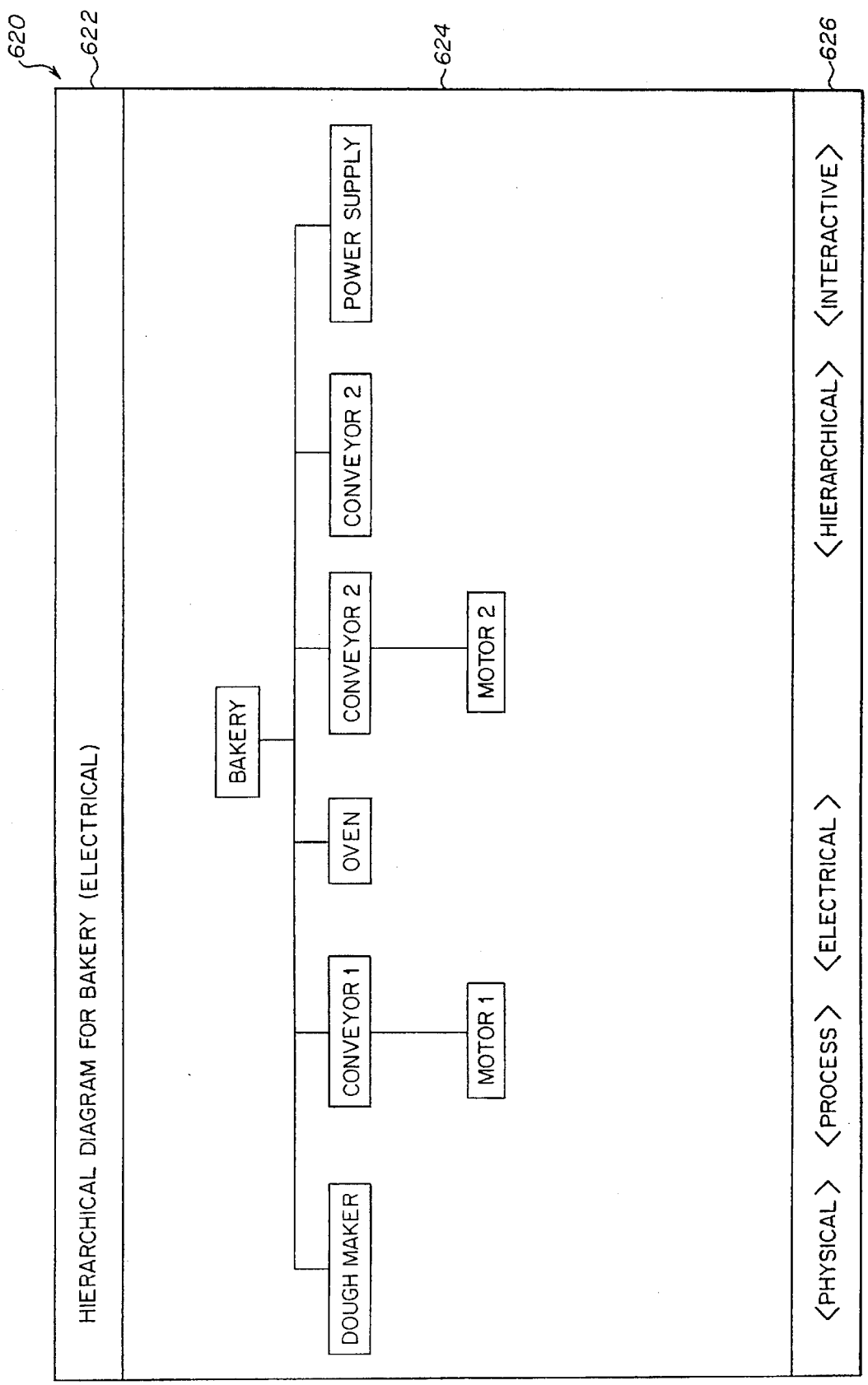
FIG. 20 is a window showing a hierarchical diagram of some of the articles in the environment of FIG. 2 in the electrical domain in accordance with the teachings of the invention.

With the hierarchy and the names of the articles determined, the program 38 displays the information in a diagram portion 604 of the hierarchical diagram window 600 as shown in FIG. 18 for the physical domain. Similarly, FIGS. 19 and 20 show the hierarchical diagram windows 610 and 670 for the process and electrical domains, respectively. These hierarchical diagram windows are created by the program 38 by traversing the process and electrical branches, respectively, of the object structure 60. The similarities between each of the hierarchical diagrams (FIGS. 18, 19 and 20) and the design team's lists (FIGS. 3, 4 and 5, respectively) should be noted since the purpose of the hierarchical diagram is to represent the hierarchical structure of the articles.

Having thus described how the invention displays views of the computerized representation, the navigation feature will now be discussed. The program 8 enables the viewer to navigate between different views of the computerized representation. In particular, when the output device displays either a hierarchical diagram or an interactive diagram, the viewer may quickly and conveniently enter a request instructing the program 8 to display a particular window containing a particular image or images.

First, when a hierarchical diagram is being viewed (i.e., displayed on the output device 36), the viewer simply selects the article name and a particular domain. For example, if, while viewing the physical hierarchical diagram window 600 as shown in FIG. 18, the viewer clicks on the word "Conveyor1" in the diagram portion 604, and clicks on the words "Electrical" and "Interactive" in the menu 676 in FIG. 20, the program 38 responds by locating the electrical domain branch (identified by the electrical root block object 62C) and the conveyor1 object set 130C (see FIG. 12) and then displaying the window 500 (see FIG. 16). The navigation feature allows the user to select between viewing a particular article's image or contents (e.g., by making a selection from the menu area of the window). If viewing the image is desired, the program 38 must locate the parent object set of the represented article rather than the object set itself, since the parent has pointers to the other images as described above. With, for example, "image" selected, the program 38 provides the interactive diagram 500 (see FIG. 16) as described above, displays the conveyor1 image 86. If viewing the "contents" is desired, the program 38 locates the conveyor object set 130C and displays the images of the conveyor1 object set's children to show the contents (i.e., images of the component articles). Accordingly, the interactive window 550 (See FIG. 17) showing the motor1 image 558 is displayed.

When an interactive diagram is being viewed, to navigate the viewer simply selects the article image that appears in the interactive diagram, a domain and either "Hierarchical" or "Interactive". For instance, if, while viewing the interactive diagram 400 in FIG. 11, the viewer clicks on the conveyor1 image 410, "Electrical" and "Interactive" in the menu 406, the program 38 responds by locating the electrical domain branch (identified by the electrical root block object 62C) and conveyor1 object set 130C and then displaying the interactive window 500 (see FIG. 16) containing the conveyor1 image 512 as described earlier.

Having thus described the feature of the invention that enables the viewer to navigate between views of the computerized representation of the bakery environment 40, the notification (or message) distribution feature will now be discussed.

As previously described, the program 38 enables a user to bind a file to an image and add parameters to an image by entering commands. When a member of the design team changes either a bound file or a parameter value, the program 38 detects the change and distributes notification of the change throughout the object structure 60. In particular, the binding object for a file includes a method that checks to see if the modification date of the file has changed. If the modification date changes, the binding object sends a change notice message to its linked aspect object for distribution. Similarly, when a parameter object detects a change in a parameter value stored in the parameter object, the parameter object sends a change notice message to its linked aspect object for distribution.

Each change notice message includes a field that may be set or changed by a design team member at any time such as when the user first created the object set to represent an article in a particular domain. This field controls where each change notice message received by the object set is to be distributed. From the viewer's perspective, the field indicates which articles' images should receive the message. However, from the perspective of the program 38, it is actually the aspect object of the articles' object set that receives and handles the message not the articles' images. Accordingly, the program 38 uses the field to determine where (i.e., to which aspect objects) the originating aspect object (i.e., the aspect object linked to the parameter object or the binding object initiated the message) should send the message. The choices of destinations are (1) other aspect objects linked to the design element object (perceived by the viewer to be the other article images that represent the same article) in different domains of the environment, (2) the parent aspect object (perceived to be the parent article image) in the same domain, (3) the children aspect objects (perceived to be the contained article images) in the same domain, (4) connected aspect objects (perceived as connected article images in the interactive diagram) in the same domain, or (5) any combination of the above.

If the message field indicates that the message is to be distributed to other aspect objects of the design element object, the originating aspect object sends the message through its linked design element object to the other aspect objects linked to the design element. For example, FIG. 7 shows a path for the oven aspect object 176B (process domain branch) to send a message through the oven design element object 178 to the oven aspect objects in the physical and electrical oven object sets 176A and 176C, respectively. Hence, the messaging system enables messages to be sent across domains. Furthermore, the messaging system enables messages to be sent between aspect objects at different hierarchical levels across domains. For instance, FIG. 8 shows the path for the motor1 aspect object of the motor1 object set 160A in the physical domain (third level) to send a message through the motor1 design element object 168 to the motor1 aspect object of the motor1 object set 160C in the electrical domain (second level). This path is useful, for example, when the plant engineer changes the size specification of the motor1 article 46 and wishes to automatically notify the electrical engineer that the electrical characteristics of the motor1 article 46 may be affected.

If the message indicates that the message is to be sent to the aspect object of the parent object set, the originating aspect object sends the message through its linked block object, through the parent block object, to the parent block object's linked aspect object. For example, as shown in FIG. 6, the rack1 aspect object 146A of the rack1 object set 140A will send a message through the rack1 block object 144A, through the conveyor1 block object 134A of the conveyor1 object set, 130A, to the conveyor1 aspect object 136A. Hence, the messaging system enables messages to pass from a child aspect object to its parent aspect object. This path is useful, for example, when the plant engineer changes the size of the rack1 portion 44 of the conveyor1 article 43 and wishes to mark the conveyor1 image 410 (see FIG. 11) as being affected by the change.

If the message indicates that the message is to be sent to the aspect object of the children object sets, the aspect object sends the message through its linked block object, through the children block objects, to the children block objects' linked aspect objects. For example, as shown in FIG. 6, the conveyor1 aspect object 136A will send a message through the conveyor1 block object 134A, through the rack1 block object 144A, to the motor1 aspect object 146A. Hence, the messaging system enables messages to pass from a parent aspect object to its children aspect objects. This path is useful, for example, when the plant engineer changes the size of the conveyor1 43 and wishes to mark the rack1 image 428 (see FIG. 12) as being affected by the change.

If the message indicates that the message is to be sent to connected aspect objects, the originating aspect object sends the message through its linked port objects, through the connection objects linked to the port objects, through other port objects linked to the other side of the connection objects, to the aspect objects linked to the other port objects. For example, as shown in FIG. 9, the dough maker aspect object 116B sends a message through its linked output port object 300, through the connection object 302, through the input port object 304, to the oven aspect object 176B. Hence, the messaging system supports passing messages between connected article representations, i.e., between images that are shown to be connected in an interactive diagram (see FIG. 14). This path is useful, for example, when the process engineer changes the dough_portions value of the dough maker 41 and wishes to mark the oven image 460 of the change (see FIG. 14).

The messages may also be sent from contained article representations. For example, FIG. 10 shows a configuration of objects that enables the dispenser aspect object 126B to send messages through its output port object 328, through the connection object 305, through the output port object 300, through the connection object 302, through the input port object 304, to the oven aspect object 176B. Hence, message passing between different article representations at different levels is achievable. Furthermore, the invention supports having the dispenser object set 120B have a child object set with a child aspect object connected via an output port object to the dispenser output port object 328 thereby chaining aspect object connections through several connection objects.

When an aspect object receives a message, the aspect object compares a value in an origination field of the message, indicating the message's origin to an exclusion list in the aspect object that is previously set by the design team. If the value is found in the exclusion list, the program 38 determines that messages from the originator are to be excluded, and the receiving aspect object ignores the message. Otherwise, the receiving aspect object handles the message according to the type of message received. For example, a binding change notice causes the aspect object to provide notification such as a notification flag adjacent either the name of the represented article in a hierarchical diagram or the article's graphical image, respectively, indicating the occurrence of the change to a bound file.

Similarly, a parameter change notice causes the program 38 to provide notification that the value of a parameter has changed. Alternatively, the parameter change notice may cause the aspect object to pass the new parameter value to any behavior objects through its design element object to recalculate the behavioral expressions as long as the new parameter value complies with any upper and lower limits stored in an input parameter object linked to aspect object reserving the message. If recalculation of the behavioral expression causes other output parameter values to change, the behavioral object updates the changed parameter values in the other parameter objects. When the other parameter objects subsequently detect the parameter value changes, they send new change notice messages to their aspect objects. Hence, a change in a parameter value may cause a change in other parameter values, i.e., trigger a cascading message effect throughout the object structure. This feature enables the invention to support "on-the-fly" methods. In other words, behavioral expressions that characterize an article in the environment may be added and recalculated "on-the-fly" similar to the way a spreadsheet recalculates the values of all the affected cells upon a change in value of one cell.

Other types of messages are supported by the invention as well. For example, the parameter objects allow the design team to specify upper and lower conditions for the input and output parameters. If an incompatibility is detected between a value provided from an output port to an input port object (e.g., the output value exceeds the upper limit or lower of the acceptable input value), the input parameter object will send an out-of-range condition notification to its linked aspect object for distribution.

Having thus described the display, navigation and message distribution systems of the invention, numerous other embodiments are anticipated by the invention and intended to be within the scope of the invention.

For example, the design information need not be provided through the input device 35 by members of a design team.

Rather, vendors of articles/machines may provide a set of object structures characterizing their machines for use by the invention. Accordingly, the object structures could be provided by diskette or other media, copied from the media into the memory 4 and incorporated into the object structure by a special command. Alternatively, the article information may be provided on a transferable media in a standardized form so that the program 38 may read the media and create objects from the article information.

Other types of domains may also be included either in addition to or instead of the domains provided in the baking example. For instance, a user may wish to represent an environment using diagrams representing the temperature, control flow, and/or other domains.

Furthermore, the ability of the invention to display different hierarchies may be used to display different variations of a directory files in a computer. For instance, a system manager may wish to structure files in a first directory structure that easily organizes the files by function. Another user may wish to structure the files in a second director structure according to user privileges.

Additionally, the invention may include an article managing system similar to a code management system. In this embodiment, a design team member reserves some objects that represent a particular article preventing other members from modifying or changing parts of the reserved articles until the member unreserves the objects.

Furthermore, the application tools that create the bound external files may be applications other than word processors. For example, the members of the design team may find it useful to bind a spreadsheet or a database to a graphical image using a third party spreadsheet or database application, respectively.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A device for defining a particular article of a complex system that is modeled on a computer system, the device comprising:

a computer-readable medium encoded with
      a design element object that identifies a particular article of the complex system;
      a first object data structure that represents the particular article of the complex system in a first domain of the complex system,
      a second object data structure that represents the particular article of the complex system in a second domain of the complex system, and
      a first link between the design element object and the first object data structure, and a second link between the design element object and the second object data structure.

2. The device of claim 1, wherein first object data structure includes a first graphical image of the particular article from a perspective of the first domain of the complex system, and wherein the second object data structure includes a second graphical image of the particular article from a perspective of the second domain of the complex system.

3. The device of claim 1, wherein the computer-readable medium is further encoded with a text file that describes the particular article, a link being formed between at least one of the first and second object data structures and the text file.

4. A method for modeling a complex system, the complex system including a plurality of articles, the method comprising the steps of:

A. receiving information that describes the plurality of articles of the complex system;
   B. generating an object structure according to the received information, the step of generating including the steps of
      providing a design element object that identifies a particular article of the complex system;
      providing a first branch of object data structures that defines a first domain of the complex system, the first branch including a first object data structure that represents the particular article of the complex system in the first domain,
      providing a second branch of object data structures that defines a second domain of the complex system, the second branch including a second object data structure that represents the particular article of the complex system in the second domain, and
      forming a first link between the design element object and the first object data structure, and a second link between the design element object and the second object data structure; and
   C. storing the object structure in a memory.

5. The method of claim 4, wherein step B further includes the steps of:
   providing a project object that defines the complex system,
   forming a third link between the first branch and the project object, and
   forming a fourth link between the second branch and the project object.

6. The method of claim 5, wherein the first object data structure includes a first graphical image of the particular article from a perspective of the first domain, wherein the second object data structure includes a second graphical image of the particular article from a perspective of the second domain, the method further comprising the steps of:
   receiving a navigation command that selects the particular article, and selects one of the first and second domains;
   locating the first object data structure when the particular article and the first domain are selected, and the second object data structure when the particular article and the second domain are selected; and
   displaying the first graphical image on the display device when the first object data structure is located, and the second graphical image when the second object data structure is located.

7. The method of claim 6, wherein the object data structures of each branch are hierarchically arranged with links formed between the object data structures, and the step of locating includes the steps of:
   finding the project object;
   selecting one of the first and second branches according to the navigation command; and traversing the object data structures of the selected one of the first and second branches, by following the links between the object data structures, until the object data structure that represents the particular article is found.

8. The method of claim 7, wherein the first object data structure has a parent object data structure that represents a parent article possessing the particular article, and wherein the step of displaying includes the step of:

displaying, when the first object data structure is selected, an interactive diagram that includes the first graphical image of the first object data structure, and that indicates the parent article as possessing the particular article.

9. The method of claim 7, wherein the first object data structure has a parent object data structure that represents a parent article of the complex system possessing a plurality of children articles including the particular article, the parent object data structure having a plurality of children object data structures including the first object data structure, and wherein the step of displaying includes the step of:

displaying, when the first object data structure is selected, an interactive diagram that includes a graphical image of each of the plurality of children object data structures, the graphical images being arranged in the interactive diagram to represent a plurality of relationships between the children articles.

10. The method of claim 6, wherein the object data structures of each of the first and second branches are hierarchically arranged, and wherein the step of displaying includes the step of:

displaying a hierarchical diagram of one of the first and second branches selected by the navigation command, the hierarchical diagram including the first graphical image of the first object data structure when the first branch is selected by the navigation command, and the second graphical image of the second object data structure when the second branch is selected by the navigation command.

11. The method of claim 4, further comprising the steps of:

detecting a change in the first object data structure of the first branch; and automatically notifying the second object data structure of the change in the first object data structure through the first and second links formed between the design element object and the first and second object data structures.

12. The method of claim 11, wherein the step of detecting a change in the first object data structure includes the step of:

determining a change in one of a first parameter value of the first object data structure, and an external file that is bound to the first object data structure.

13. The method of claim 12, wherein the step of automatically notifying includes the step of:

sending a change notification message from the first object data structure to the second object data structure through the first and second links formed between the design element object and the first and second object data structures, the change notification message defining the change.

14. The method of claim 13, further comprising the step of:

updating a behavioral expression of a behavioral object linked to the design element object when the change is determined, the behavioral expression changing a second parameter value according to the change in the first parameter value.

15. The method of claim 14, further comprising the step of:

updating another object data structure with the changed second parameter value to enable the another object data structure to determine a change in the second parameter value thereby causing a cascading effect.

16. The method of claim 13, further comprising the step of:

relaying the change notification message from the second object data structure to another object data structure of the object structure such that both the second object data structure and the another object data structure receive the change notification message.

17. The method of claim 13, further comprising the steps of:

comparing an origin indicator of the sent change notice message with an exclusion list;

outputting an indication of receipt of the change notice message when the origin indicator does not match an entry on the exclusion list; and ignoring the change notice message when the origin indicator matches an entry on the exclusion list.

18. The method of claim 4, wherein the first branch includes at least one other object data structure, the first object data structure being one of a parent, a child, and a sibling of the at least one other data structure, the method further comprising the steps of:

detecting a change in the first object data structure of the first branch, and automatically notifying the at least one other object data structure of the detected change in the first object data structure through a link formed between the first object data structure and the at least one other object data structure.

19. The method of claim 18, wherein the step of automatically notifying includes the step of:

sending a change notification message from the first object data structure to the at least one other object data structure through the link formed between the first object data structure and the at least one other object data structure, the change notification message defining the detected change.

20. The method of claim 19, further comprising the step of:

relaying the change notification message from the at least one other object data structure to another object data structure of the object structure through a link formed between the at least one other object data structure and the another object data structure.

21. The method of claim 4, wherein the object structure includes a plurality of branches of object data structures, each branch defining a domain of the complex system, the plurality of branches including the first and second branches that define the first and second domains of the complex system, respectively, and wherein step B includes the steps of:

providing a plurality of design object elements, each design object element identifying one of the plurality of articles of the complex system, the step of providing the plurality of design object elements including the step of providing the design object element that identifies the particular article;

providing the plurality of branches of object data structures, the step of providing the plurality of branches including the steps of providing the first and second branches; and forming links between the object data structures of each branch and the plurality of design element objects such that each design object element has at most one link with each branch, the step of forming the links including the step of forming the first link and the second link.

22. The method of claim 4, wherein the first object data structure includes a first pointer, wherein the second object data structure includes a second pointer, wherein the design element object includes a third pointer and a fourth pointer, and wherein the step of forming includes the steps of:

setting the first pointer of the first object data structure to point to the design element object, and the third pointer of the design element object to point to the first object data structure to form the first link; and setting the second pointer of the second object data structure to point to the design element object, and the fourth pointer of the design element object to point to the second object data structure to form the second link.

23. An apparatus for modeling a complex system, the complex system including a plurality of articles, the apparatus comprising:

a computer including a processor, a memory, and an input device, the computer further including means for receiving information that describes the plurality of articles of the complex system from the input device;

means for generating an object structure according to the received information, the means for generating including means for providing a design element object that identifies a particular article of the complex system;

means for providing a first branch of object data structures that defines a first domain of the complex system, the first branch including a first object data structure that represents the particular article of the complex system in the first domain, means for providing a second branch of object data structures that defines a second domain of the complex system, the second branch including a second object data structure that represents the particular article of the complex system in the second domain, and means for forming a first link between the design element object and the first object data structure, and a second link between the design element object and the second object data structure; and means for storing the object structure in the memory.

24. The apparatus of claim 23, wherein the means for generating further includes:

means for providing a project object that defines the complex system, means for forming a third link between the first branch and the project object, and means for forming a fourth link between the second branch and the project object.

25. The apparatus of claim 24, wherein the computer further includes a display device, and wherein the first object data structure includes a first graphical image of the particular article from a perspective of the first domain, wherein the second object data structure includes a second graphical image of the particular article from a perspective of the second domain, the apparatus further comprising:

means for receiving a navigation command that selects the particular article, and selects one of the first and second domains;

means for locating the first object data structure when the particular article and the first domain are selected, and the second object data structure when the particular article and the second domain are selected; and means for displaying the first graphical image on the display device when the first object data structure is located, and the second graphical image when the second object data structure is located.

26. The apparatus of claim 25, wherein the object data structures of each branch are hierarchically arranged with links formed between the object data structures, and the means for locating includes:

means for finding the project object;

means for selecting one of the first and second branches according to the navigation command; and means for traversing the object data structures of the selected one of the first and second branches, by following the links between the object data structures, until the object data structure that represents the particular article is found.

27. The apparatus of claim 26, wherein the first object data structure has a parent object data structure that represents a parent article possessing the particular article, and wherein the means for displaying includes:

means for displaying, when the first object data structure is selected, an interactive diagram that includes the first graphical image of the first object data structure, and that indicates the parent article as possessing the particular article.

28. The apparatus of claim 26, wherein the first object data structure has a parent object data structure that represents a parent article of the complex system possessing a plurality of children articles including the particular article, the parent object data structure having a plurality of children object data structures including the first object data structure, and wherein the means for displaying includes:

means for displaying, when the first object data structure is selected, an interactive diagram that includes a graphical image of each of the plurality of children object data structures, the graphical images being arranged in the interactive diagram to represent a plurality of relationships between the children articles.

29. The apparatus of claim 25, wherein the object data structures of each of the first and second branches are hierarchically arranged, and wherein the means for displaying includes:

means for displaying a hierarchical diagram of the first and second branches selected by the navigation command, the hierarchical diagram including the first graphical image of the first object data structure when the first branch is selected, and the second graphical image of the second object data structure when the second branch is selected.

30. The apparatus of claim 23, further comprising:

means for detecting a change in the first object data structure of the first branch; and means for automatically notifying the second object data structure of the change in the first object dat structure through the first and second links formed between the design element object and the first and second object data structures.

31. The apparatus of claim 30, wherein the means for detecting a change in the first object data structure includes:

means for determining a change in one of a first parameter value of the first object data structure, and an external file that is bound to the first object data structure.

32. The apparatus of claim 31, wherein the means for automatically notifying includes:

means for sending a change notification message from the first object data structure to the second object data structure through the first and second links formed between the design element object and the first and second object data structures, the change notification message defining the change.

33. The apparatus of claim 32, further comprising:

means for updating a behavioral expression of a behavioral object linked to the design element object when the change is determined, the behavioral expression changing a second parameter value according to the change in the first parameter value.

34. The apparatus of claim 33, further comprising:

means for updating another object data structure with the changed second parameter value to enable the another object data structure to determine a change in the second parameter value thereby causing a cascading effect.

35. The apparatus of claim 32, further comprising:

means for relaying the change notification message from the second object data structure to another object data structure of the object structure such that both the second object data structure and the another object data structure receive the change notification message.

36. The apparatus of claim 32, further comprising:

means for comparing an origin indicator of the sent change notice message with an exclusion list;

means for outputting an indication of receipt of the change notice message when the origin indicator does not match an entry on the exclusion list; and means for ignoring the change notice message when the origin indicator matches an entry on the exclusion list.

37. The apparatus of claim 23, wherein the first branch includes at least one other object data structure, the first object data structure being one of a parent, a child, and a sibling of the at least one other data structure, the apparatus further comprising:

means for detecting a change in the first object data structure of the first branch, and means for automatically notifying the at least one other object data structure of the detected change in the first object data structure through a link formed between the first object data structure and the at least one other object data structure.

38. The apparatus of claim 37, wherein the means for automatically notifying includes:

means for sending a change notification message from the first object data structure to the at least one other object data structure through a link formed between the first object data structure and the at least one other object data structure, the change notification message defining the detected change.

39. The apparatus of claim 38, further comprising:

means for relaying the change notification message from the at least one other object data structure to another object data structure of the object structure through a link formed between the at least one other object data structure and the another object data structure.

40. The apparatus of claim 23, wherein the object structure includes a plurality of branches of object data structures, each branch defining a domain of the complex system, the plurality of branches including the first and second branches that define the first and second domains of the complex system, respectively, wherein the means for generating includes:

means for providing a plurality of design object elements, each design object element identifying one of the plurality of articles of the complex system, the means for providing the plurality of design object elements including the means for providing the design object element that identifies the particular article;

means for providing the plurality of branches of object data structures, the means for providing the plurality of branches including the means for providing the first branch and the means for providing the second branch; and means for forming links between the object data structures of each branch and the plurality of design element objects such that each design object element has at most one link with each branch, the means for forming the links including the means for forming the first link and the second link.

41. The apparatus of claim 23, wherein the first object data structure includes a first pointer, wherein the second object data structure includes a second pointer, wherein the design element object includes a third pointer and a fourth pointer, and wherein the means for forming includes:

means for setting the first pointer of the first object data structure to point to the design element object, and the third pointer of the design element object to point to the first object data structure to form the first link; and means for setting the second pointer of the second object data structure to point to the design element object, and the fourth pointer of the design element object to point to the second object data structure to form the second link.

* * * * *